(12) United States Patent
Tanaka et al.

(10) Patent No.: US 7,462,058 B2
(45) Date of Patent: Dec. 9, 2008

(54) ELECTRONIC APPARATUS AND FIXING COMPONENT

(75) Inventors: Kaigo Tanaka, Kawasaki (JP); Ikki Tatsukami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/639,302

(22) Filed: Dec. 15, 2006

(65) Prior Publication Data

US 2007/0218726 A1 Sep. 20, 2007

(30) Foreign Application Priority Data

Mar. 20, 2006 (JP) .............................. 2006-076116

(51) Int. Cl.
*H01R 13/648* (2006.01)

(52) U.S. Cl. ..................... 439/385; 439/540.1; 439/573; 439/942

(58) Field of Classification Search ................. 439/501, 439/159, 528, 686, 385, 540.1, 573, 942; 361/686

See application file for complete search history.

(56) References Cited

U.S. PATENT DOCUMENTS

| | | | |
|---|---|---|---|
| 5,676,569 A * | 10/1997 | Davis ......................... | 439/731 |
| 5,709,569 A * | 1/1998 | Buck et al. ................... | 439/607 |
| 5,934,940 A | 8/1999 | Maranto et al. | |
| 5,980,313 A * | 11/1999 | Kunishi et al. ............... | 439/545 |
| 6,385,038 B1 * | 5/2002 | Ohnishi et al. ............... | 361/683 |
| 6,488,517 B1 * | 12/2002 | Williams et al. ............ | 439/165 |
| 6,700,791 B1 * | 3/2004 | Zappacosta .................. | 361/759 |
| 7,037,135 B2 * | 5/2006 | Chen et al. ................... | 439/607 |
| 7,079,385 B1 * | 7/2006 | Cheng et al. ................. | 361/686 |
| 7,227,747 B2 * | 6/2007 | Walker et al. ................ | 361/686 |

FOREIGN PATENT DOCUMENTS

| | | |
|---|---|---|
| CN | 1212485 A | 3/1999 |
| JP | 2000-138465 | 5/2000 |

OTHER PUBLICATIONS

Chinese Office Action dated Jul. 25, 2008 for Chinese Patent Application No. 200710001307.3.

* cited by examiner

*Primary Examiner*—Neil Abrams
*Assistant Examiner*—Phuong Nguyen
(74) *Attorney, Agent, or Firm*—Staas & Halsey LLP

(57) ABSTRACT

An electronic apparatus includes a housing having an opening, a connector disposed at a position allowing the connector to face out from the opening and transferring signals to and from an external device. The electronic apparatus also includes a fixing component that secures the connector to the electronic apparatus. The fixing component has a pressure plate that is spread on and in contact with a surface of the connector where a projection is formed. The pressure plate has an escape section for accepting the projection.

8 Claims, 27 Drawing Sheets

ELECTRONIC APPARATUS AND FIXING COMPONENT

CROSS REFERENCE TO RELATED APPLICATIONS

This application claims the benefit under 35 U.S.C. Section 119, of Japanese Patent Application No. 2006-076116, filed Mar. 20, 2006, which is hereby incorporated by reference in its entirety into this application.

BACKGROUND OF THE INVENTION

1. Field of the Invention

The present invention relates to an electronic apparatus such as a notebook personal computer and a fixing component to be used in the electronic apparatus.

2. Description of the Related Art

Conventionally, various types of electronic apparatus including notebook personal computers have a connector incorporated therein for transferring signals to and from an external device. Typically, another connector to be mated with the connector incorporated in the electronic apparatus is manually inserted therein or removed therefrom by a user. During such insertion/removal, unintentional stress is often applied on the connector incorporated in the electronic apparatus. Therefore, the connector incorporated in the electronic apparatus needs to be sufficiently secured to the housing of the electronic apparatus. For this purpose, a fixing component is often provided to reinforce the connector incorporated in the electronic apparatus.

Japanese Patent Application Publication No. 2000-138465 proposes a technique devised to block dust from entering an opening of a connector, which is however nothing to do with reinforcement and fixing.

There are various types of connectors that can be incorporated in an electronic apparatus to transfer signals to and from an external device. Among such various types of connectors, there is, for example, a USB connector that partially projects beyond its original outline dimensions when a mating connector is inserted therein.

However, such a connector whose shape is changeable between the connected state and the disconnected stated has a problem of how to reinforce and secure the connector.

In view of the foregoing, the present invention provides a fixing component capable of sufficiently securing such a shape-changeable connector with a simple structure and an electronic apparatus having the fixing component incorporated therein.

SUMMARY OF THE INVENTION

The present invention provides an electronic apparatus including:

a housing having an opening;

a connector disposed at a position allowing the connector to face out from the opening and with which a mating connector is removably mated; and a fixing component that secures the connector to the electronic apparatus, wherein the connector has a projection that projects beyond outline dimensions of the connector in one of a state when the connector is mated with the mating connector and a state when the connector is demated from the mating connector, and the fixing component has a pressure plate that is spread on and in contact with a surface of the connector where the projection is formed, the pressure plate having an escape section for accepting the projection.

The electronic apparatus of the invention employs the fixing component having the pressure plate with the escape section formed therein. Accordingly, it is possible to sufficiently secure the connector even when the projection is formed.

In the electronic apparatus according to the invention, the escape section may be a hole formed in the pressure plate.

Because the hole is formed, interference with the projection can be readily avoided.

Further, in the electronic apparatus according to the invention, preferably, the connector is plurally disposed such that adjacent surfaces of the connectors become flush with each other, the surfaces each having a projection formed thereon, and the fixing component has a pressure plate that is spread on and in contact with the surfaces of the connectors where the projections are formed, and the pressure plate has escape sections for accepting the projections, so that the connectors are secured to the electronic apparatus with the fixing component that is a single component.

This additional feature makes it possible to secure two or more connectors each having a projection by means of a single fixing component.

The fixing component alone used in the above electronic apparatus of the invention can be provided by the invention.

As described above, it is possible to sufficiently secure a shape-changeable connector with a simple structure while allowing easy insertion/removal of an internal connector.

DETAILED DESCRIPTION OF THE INVENTION

An embodiment of the present invention will be described.

1. Appearance

Figure 1:
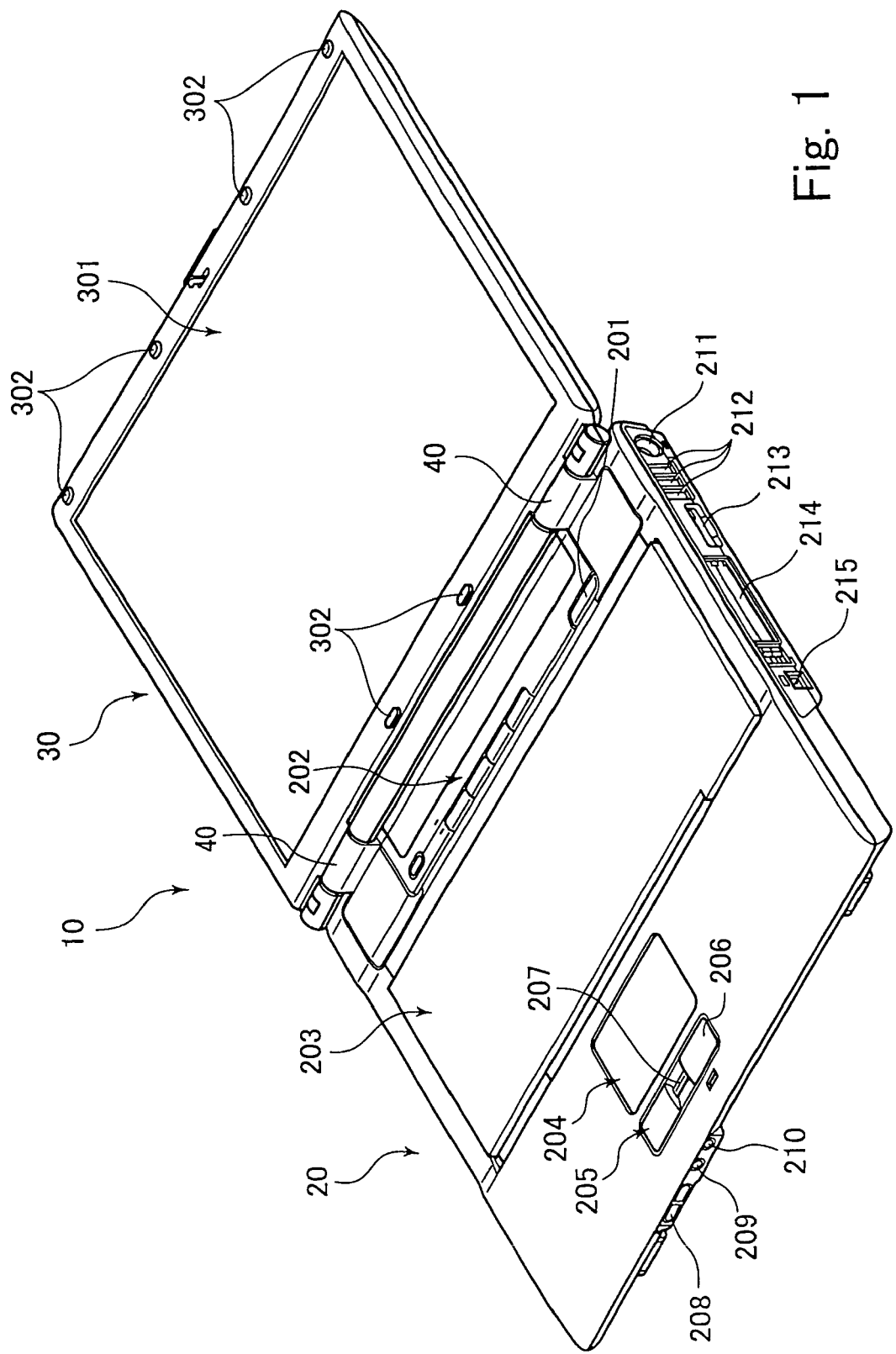
FIG. 1 is a diagram showing a display unit in open position.
Figure 2:
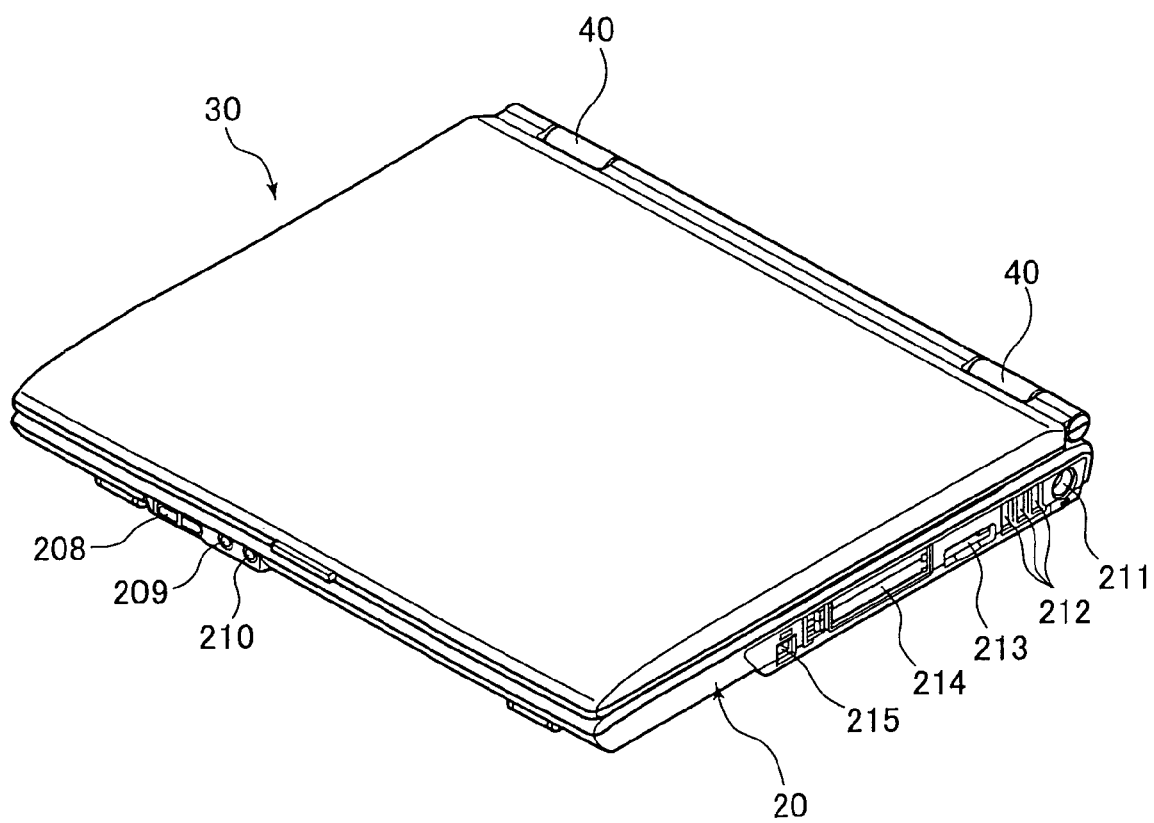
FIG. 2 is a diagram showing the display unit in closed position.

FIGS. 1 and 2 are perspective views of a notebook personal computer (hereinafter referred to as "notebook PC") 10 according to an embodiment of the present invention. FIGS. 1 and 2 illustrate the notebook PC 10 with a display unit 30 in an open state and a closed state, respectively.

The notebook PC 10 is composed of a main unit 20 and a display unit 30. Hinge sections 40 are provided to support the display unit 30 so that the display unit 30 can be opened and closed with respect to the main unit 20.

The main unit 20 includes a substantially box-shaped housing equipped with a power button 201, function buttons 202, a keyboard 203, a touchpad 204, a left-click button 205 and right-click button 206 for the touchpad 204, a fingerprint sensor 207 and the like. Disposed on the front end surface of the main unit 20 are a wireless LAN switch 208, a speaker connection terminal 209, a microphone connection terminal 210 and the like. The back of the touchpad 204 is overlaid with a digitizer as will be described later in detail. Further, disposed on the right flank of the main unit 20 are a DC power connection terminal 211, three USB connectors 212, a media slot 213 into which various media (SD card™, xD card™, etc.) are removably inserted, a PC card slot 214 into which a PC card is removably inserted, a IEEE1394 connector 215 and the like.

Although not shown in figures, the main unit 20 includes a built-in motherboard on which a CPU and various components are mounted. The motherboard is substantially equal to the keyboard 203 in size and disposed under the keyboard 203. Accordingly, the touchpad 204 and the digitizer on the back thereof are positioned on a so-called palmrest section of the main unit 20 avoiding an area covered by the motherboard.

The display unit 30 has a large-sized display screen 301 on the front surface thereof. Around the display screen 301, there are formed projections 302 for preventing the display screen 301 from directly abutting the top surface of the main unit 20 when the display unit 30 is closed on the main unit 20.

The hinge sections 40 are so configured as to support the display unit 30 in such a manner that the display unit 30 is openable and closeable with respect to the main unit 20. The hinge sections 40 are disposed approximately at both ends of a laterally extending edge of the display unit 30, which edge faces the main unit 20. In a portion of the edge between the hinge sections 40, there is formed a space for accommodating cables that will be described later.

The display unit 30 needs to be rotatable with respect to the main unit 20 and at the same time, it must be capable of remaining in any position when the display unit 30 is open with respect to the main unit 20. For this purpose, the hinge sections 40 serve to apply friction so that the display unit 30 can remain in any position when the display unit 30 is open with respect to the main unit 20.

2. Touchpad and Digitizer

Figure 3:
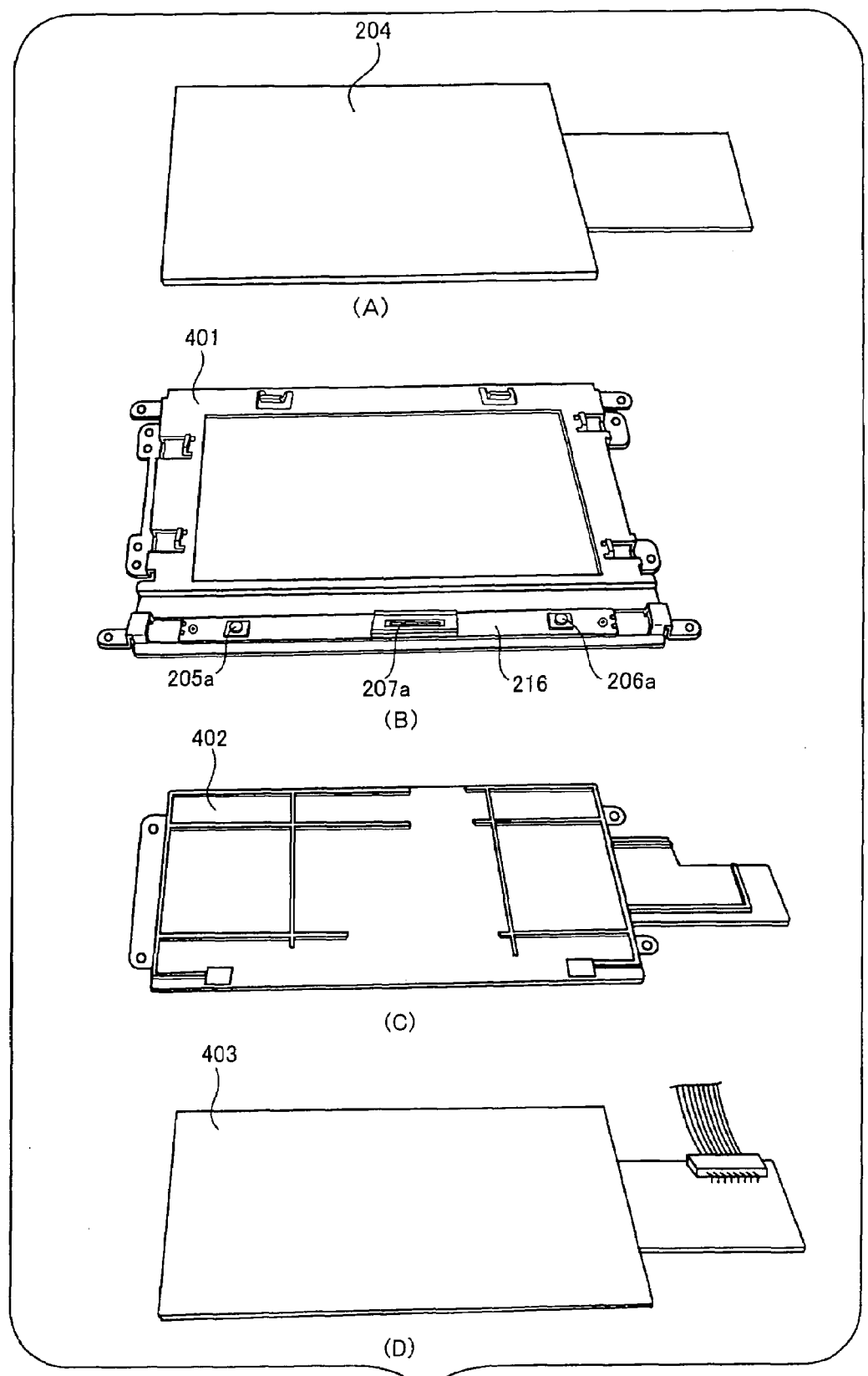
FIG. 3 is an exploded perspective view of a portion of a main unit of a notebook PC, where a touchpad is disposed.
Figure 4:
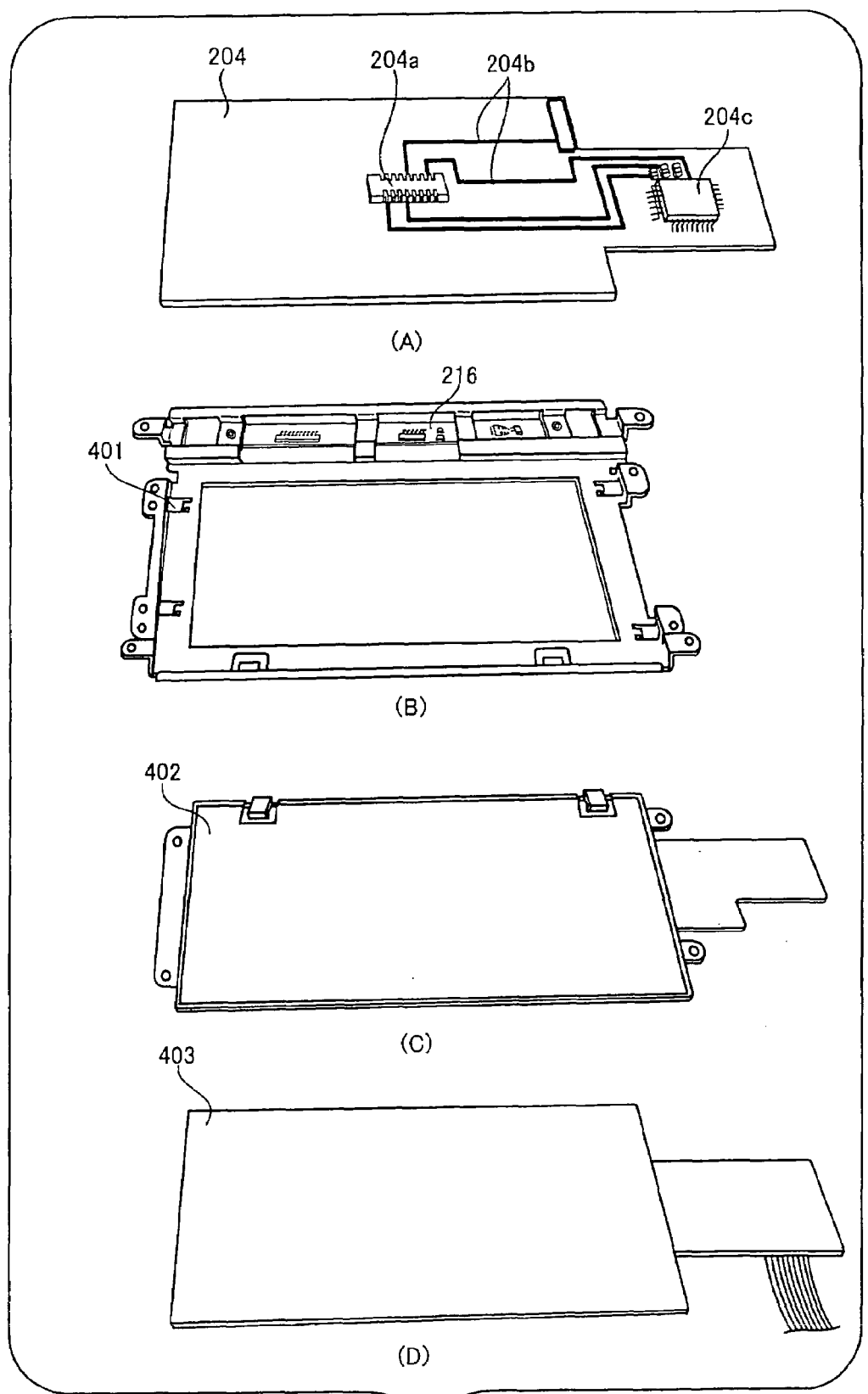
FIG. 4 is a perspective view of elements (A) through (D) shown in FIG. 3, as viewed from back.

FIG. 3 is an exploded perspective view of a portion of the main unit 20 of the notebook PC 10 shown in FIG. 1, where the touchpad 204 is disposed. FIG. 4 is a perspective view of elements (A) through (D) shown in FIG. 3, as viewed from back.

On the top surface of the main unit 20 shown in FIG. 1, there appears a surface of the touchpad 204 shown in part (A) of FIG. 3. Under the touchpad 204, a metal frame member 401 shown in part (B), a plastic support member 402 shown in part (C) and a digitizer 403 shown in part (D) are stacked in this order as shown in FIG. 3.

The touchpad 204 is configured to detect a movement or a position of a finger placed thereon by utilizing a change in the capacitance of a portion where the finger is placed, which change is caused by the placement of the finger. The touchpad 204 is used to move a cursor on the display screen 301 (see FIG. 1).

The metal frame member 401 supports the touchpad 204 disposed thereon. The metal frame member 401 also supports a circuit board 216 having thereon: a switch 205a for detecting the left-click button 205 being pressed; a switch 206a for detecting the right-click button 206 being pressed; and a line sensor 207a of the fingerprint sensor 207, which carries out actual detection of a touch.

The plastic support member 402 reinforces the digitizer 403 disposed thereunder and prevents a pressure applied on the touchpad 204 from being transmitted to the digitizer 403.

The digitizer 403 is capable of detecting a position and a movement of the tip of a stylus by utilizing magnetic effects caused by the stylus tapped and moved on the touchpad 204. The digitizer 403 is used to input handwritten characters, graphics, etc. made by movements of the tip of the stylus on the touchpad 204. The aspect ratio of an area, in which the digitizer 403 can detect the position of the tip of the stylus while the tip of the stylus is moved on the touchpad 204, is equal to the aspect ratio of the display screen 301 shown in FIG. 1. This allows a user to input information by handwriting it on the touchpad 204 while looking at a position displayed on the display screen 301.

As described above, the main unit 20 has the touchpad 204 and the digitizer 403 disposed thereon, which have different ways of detecting user operations.

Figure 5:
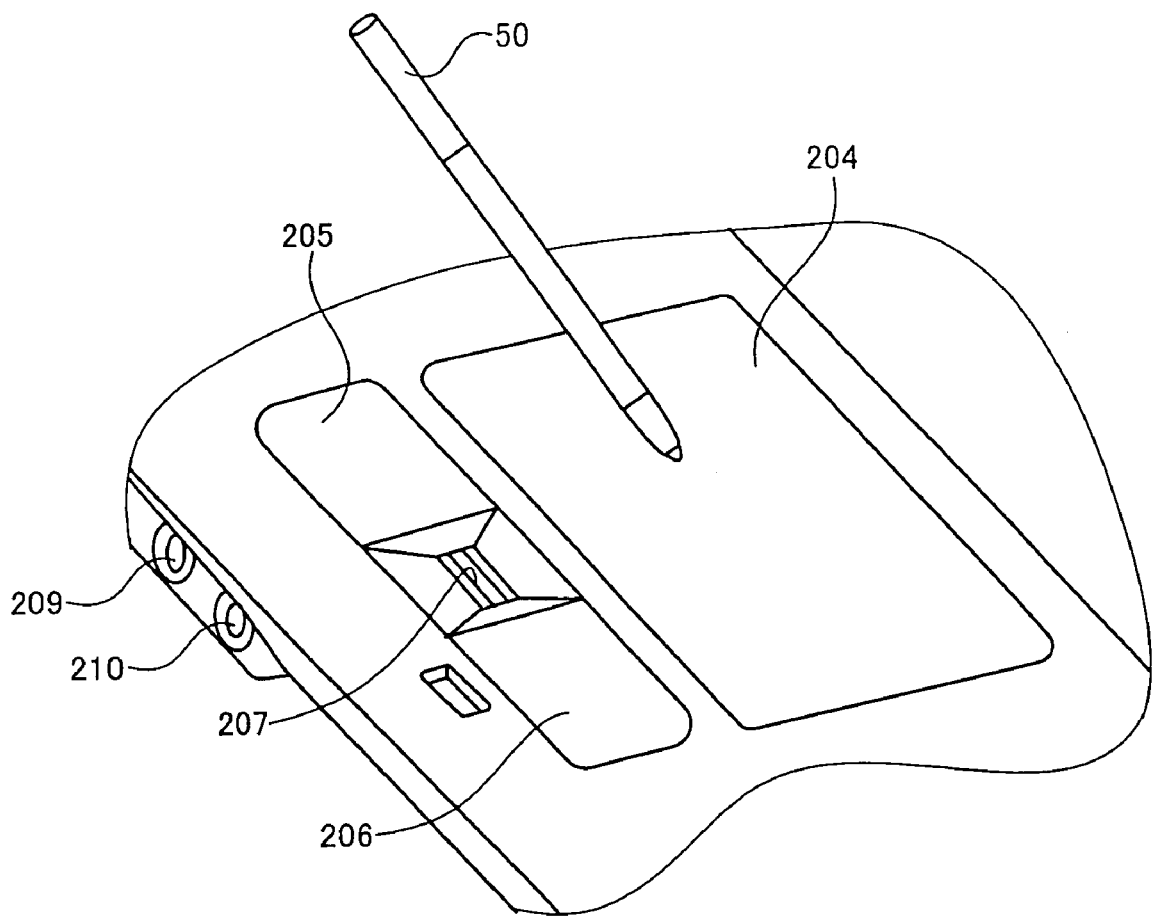
FIG. 5 is a diagram showing a state in which a stylus is in contact with the touchpad.

FIG. 5 is a diagram showing a state in which a stylus 50 is in contact with the touchpad 204.

The stylus 50 has at the tip thereof a built-in resonance circuit composed of coil and capacitor. Resonance occurs in the stylus 50 upon receipt of an electromagnetic force applied from the digitizer 50. The digitizer 403 is configured to detect a position of the tip of the stylus 50 by receiving the resonance. The stylus 50 also has a sensor for detecting a pressure exerted by the tip of the stylus 50 and therefore is capable of returning a modulated signal according to the detected pressure to the digitizer 403 so that the digitizer 403 can also detect the pressure. The stylus 50 may be provided with a push button and configured to return a modulated signal in response to a push of the button to the digitizer 403 so that the digitizer 403 can detect the button being pushed.

The digitizer 403 and the stylus 50 start exchanging electromagnetic signals therebetween when the tip of the stylus 50 is tapped on the touchpad 204. This is possible only when no large metallic body or the like is disposed between a surface of the touchpad 204 and the digitizer 403, which metallic body reduces a large amount of electromagnetic force. For this reason, as shown in FIG. 4, only a single connector 204a and separate wires 204b connected to be used for the connector 204a are disposed in a portion of a board within a detection-effective area where the tip of the stylus 50 can be detected by the digitizer 403. In addition, an LSI 204c, which is a large block and serves as a circuit for controlling the touchpad 204, is disposed in a portion of the board outside the detection-effective area. This layout is provided for the purpose of preventing large reduction of electromagnetic force.

Figure 6:
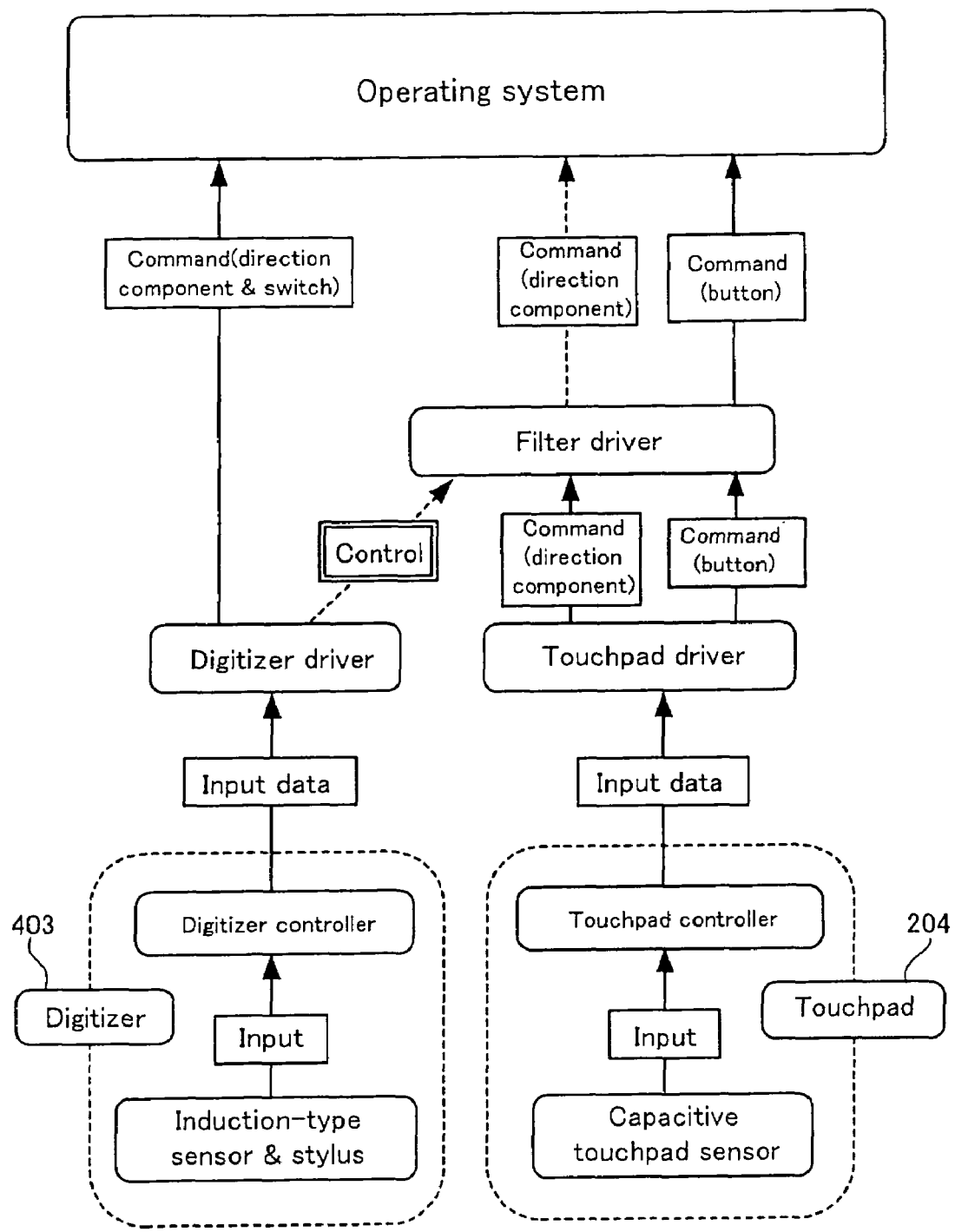
FIG. 6 is a diagram showing the relationship between a digitizer and the touchpad in terms of control.

FIG. 6 is a diagram showing the relationship between the digitizer 403 and the touchpad 204 in terms of control.

The digitizer 403 is provided with an induction-type sensor and the stylus. The digitizer 403 is also provided with a digitizer controller that receives an input signal generated by interaction between the induction-type sensor and the stylus so that the digitizer can detect information such as a position of the tip of the stylus. Data representing the result of the detection is input to a digitizer driver. According to the input data, the digitizer driver generates a direction component representing the direction in which the tip of the stylus has moved and an appropriate command representing a switching operation and the like. Subsequently, the digitizer driver transmits the generated component and the command to an operating system and controls a filter driver that will be described later.

On the other hand, the touchpad 204 includes a capacitive touchpad sensor. The touchpad 204 also includes a touchpad controller that receives an input signal generated by interaction between the touchpad sensor and a finger in response to a touch of the finger on the touchpad 204 so that the touchpad controller can detect a position of the finger. A press of the left-click button 205 and a press of the right-click button 206 shown in FIG. 1 are also detected here. The touchpad controller inputs data according to the result of the detection into a touchpad driver. The touchpad driver transmits a command according to the input data to the filter driver. Commands to be transmitted from the touchpad driver to the filter driver are broadly divided into two types: command representing a direction component generated by a movement of a finger on the touchpad and command representing a press of the left-click button 205 or right-click button 206. According to the control by the digitizer driver, the filter driver transmits only a suitable command out of commands sent from the touchpad driver. Specifically, of a command representing a direction component sent from the touchpad driver and a command representing a button operation, the filter driver prohibits or allows the transmission of the command representing the direction component to the operating system according to the control of the digitizer driver, which will be described below more in detail.

The operating system performs appropriate processing based on a command sent from the digitizer driver and a command sent from the touchpad driver passing through the filter driver.

Figure 7:
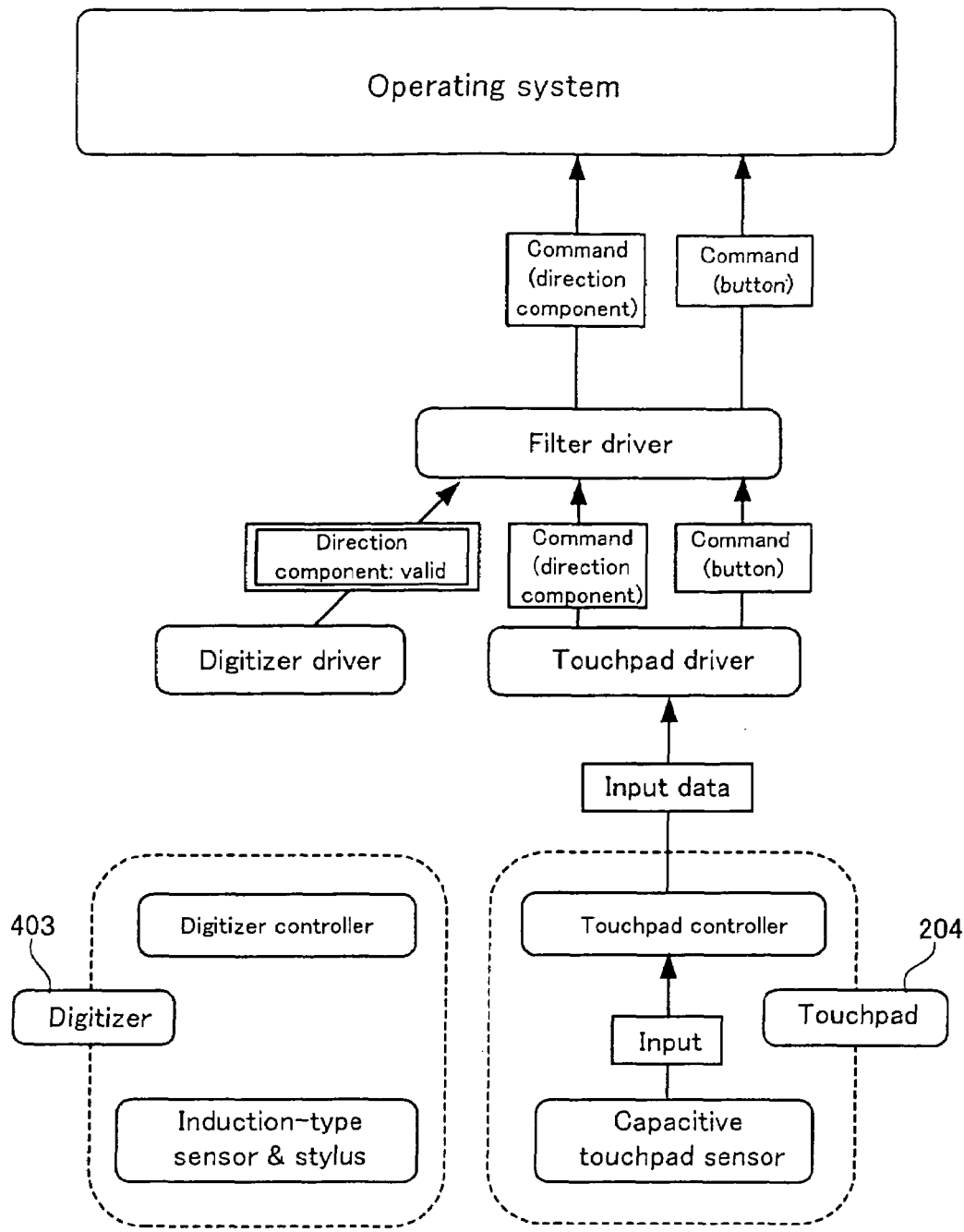
FIG. 7 is another diagram showing the relationship between the digitizer and the touchpad in terms of control.

FIG. 7 is another diagram showing the relationship between the digitizer 403 and the touchpad 204 in terms of control. FIG. 7 shows a state in which the stylus is not in contact with the touchpad 204 and therefore, detection by the digitizer 403 is not performed.

In this case, the digitizer driver controls the filter driver under a condition that a direction component sent from the touchpad driver is also valid. According to the control, the filter driver transmits both a command representing the direction sent from the touchpad driver and a command representing a button operation to the operating system.

Figure 8:
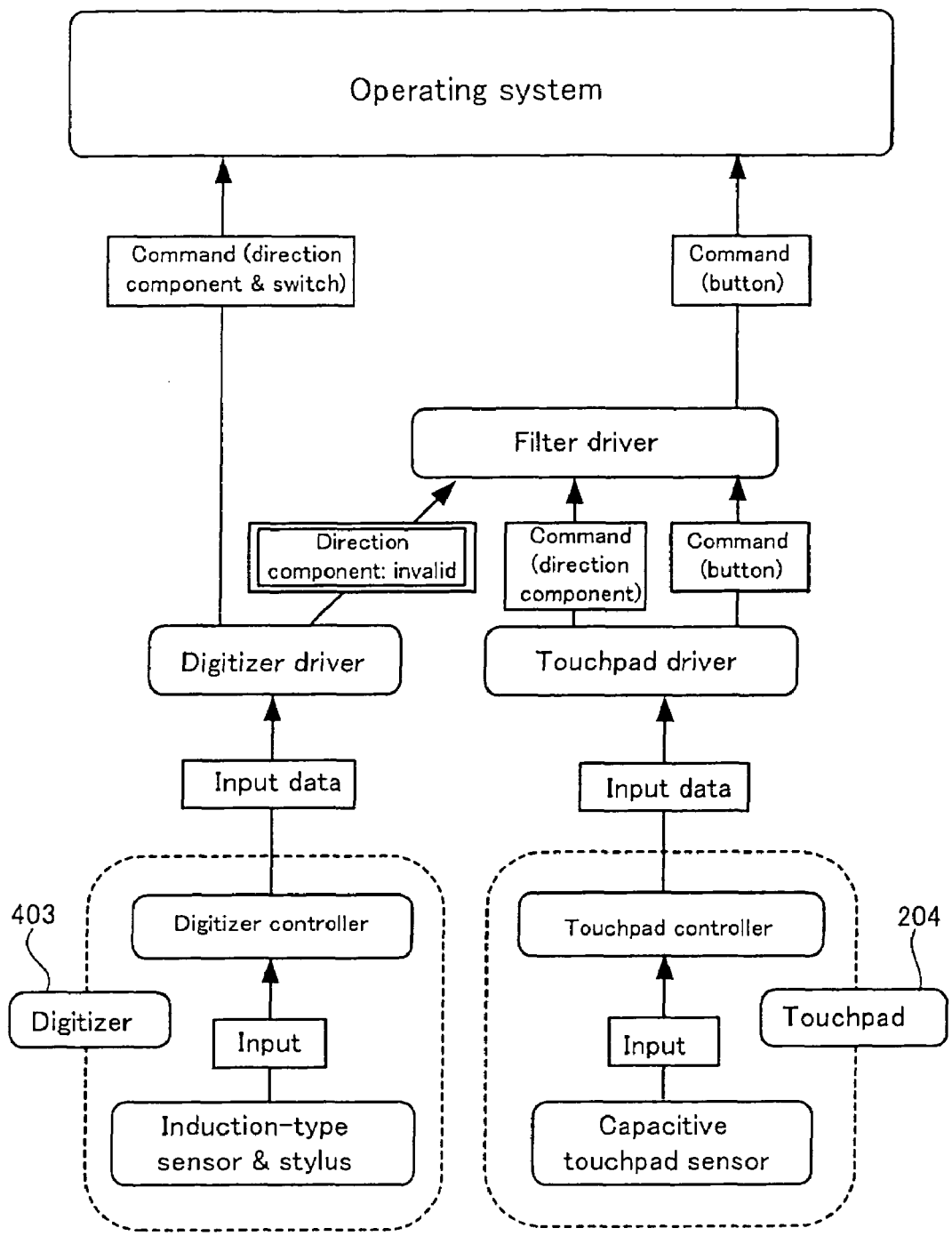
FIG. 8 is another diagram showing the relationship between the digitizer and the touchpad in terms of control.

FIG. 8 is another diagram showing the relationship between the digitizer 403 and the touchpad 204 in terms of control. FIG. 8 shows a state in which detection by the digitizer 403 is performed.

In this case, the digitizer driver transmits a command representing a direction component and an ON/OFF state of a switch of a stylus to the operating system when such a stylus is used, and also controls the filter driver under a condition that the direction component from the touchpad driver is invalid. According to the control, the filter driver prohibits the command representing the direction component of the moved finger from being transmitted to the operating system even when the command representing the direction component of the moved finger is sent from the touchpad driver. At the same time, the filter driver transmits to the operating system only a command representing a press of the left-click button 205 or right-click button 206 sent from the touchpad driver.

In this way, the control by the digitizer 403 and the control by the touchpad 204 can be adjusted to prevent a conflict therebetween even if a hand holding the stylus is brought into contact with the touchpad. Also, such a way of control prevents operation errors from occurring in the touchpad during input operation using the stylus.

Figure 9:
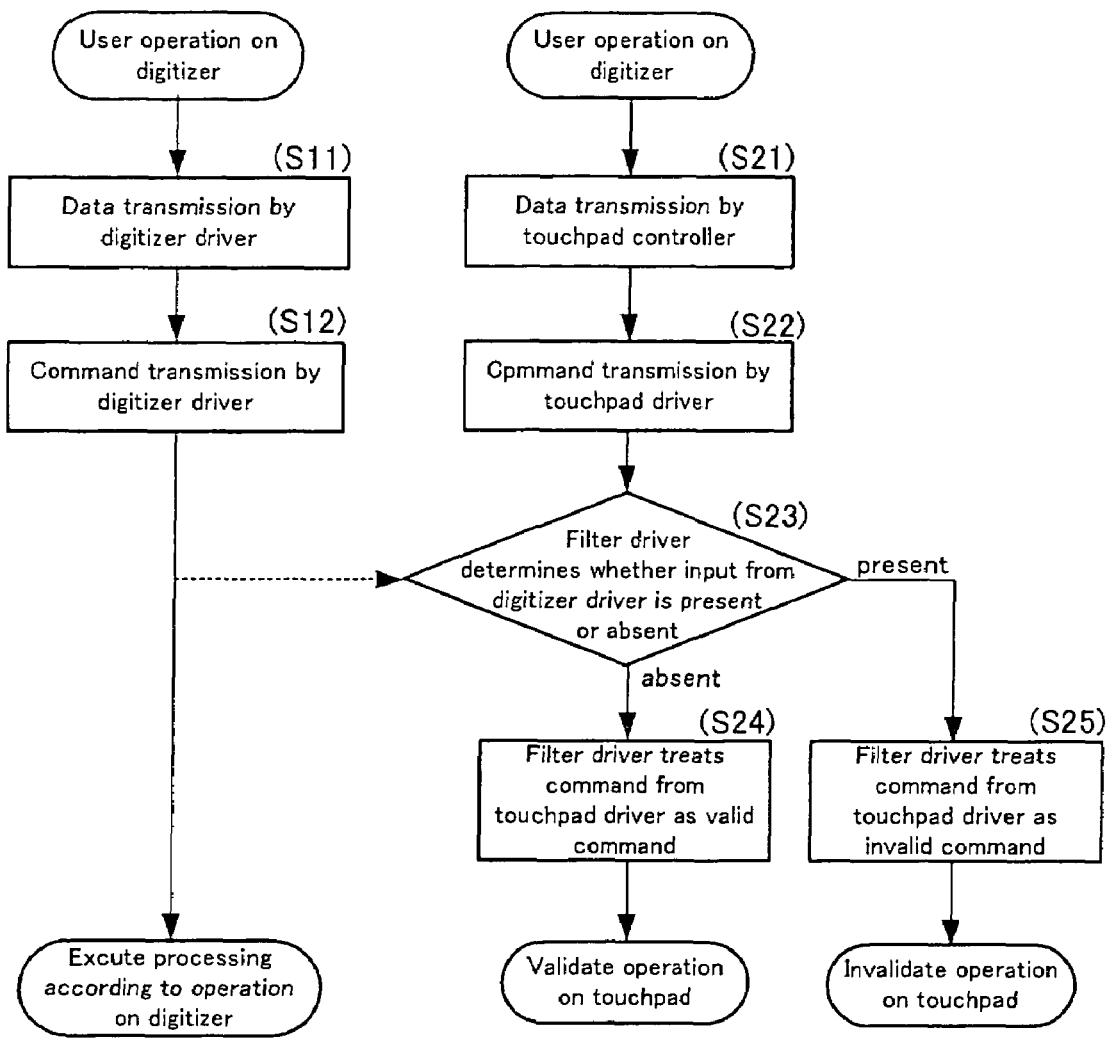
FIG. 9 is a flowchart showing a process for avoiding a conflict between detection by the digitizer and detection by the touchpad.

FIG. 9 is a flowchart showing a process for avoiding a conflict between detection by the digitizer and detection by the touchpad.

The process shown in FIG. 9 will be briefly described below since it has been already described with reference to FIGS. 6 through 8.

In response to user operation on the digitizer, the digitizer controller transmits data to the digitizer driver (step S11). Upon receipt of the data, the digitizer driver transmits a command (step S12) and subsequently, processing according to the user operation on the digitizer is performed through the operating system.

On the other hand, in response to user operation on the touchpad, the touchpad controller transmits data to the touchpad driver (step S21). Upon receipt of the data, the touchpad driver transmits a command to the filter driver (step S22). The filter driver determines whether input from the digitizer driver is present or absent (step S23). The filter driver treats the command from the touchpad driver as a valid command when input from the digitizer driver is absent (step S24). Subsequently, processing according to the user operation on the touchpad is performed through the operating system. However, when input from the digitizer driver is present (step S24), the filter driver treats the command from the touchpad driver as invalid and treats only a command representing the left-click button 205 or right-click button 206 as valid for the touchpad (step S25).

As described above, the embodiment employs such a structure that the touchpad is overlaid on the digitizer, which allows the touchpad and the digitizer to share a common space thereby saving more space than a case without such an overlaid structure.

Further, the overlaid structure according to the embodiment enables a user to perform seamless operation by using both a hand and a stylus. For example, the user can carry out operation with the stylus while still holding the style, immediately after operation with the stylus. Therefore, the overlaid structure of the embodiment has improved operability further than a case without such an overlaid structure or a case with a display screen overlaid on a digitizer.

Furthermore, the overlaid structure according to the embodiment makes a user to readily notice that the touchpad and the digitizer cannot be used at the same time.

In addition, the embodiment employs such a structure that the touchpad and the digitizer are disposed approximately at the center in the width direction of the notebook PC 10, which allows both right-handed users and left-handed users to readily operate the touchpad and the digitizer.

3. Security Lock Hole and USB Connector

Figure 10:
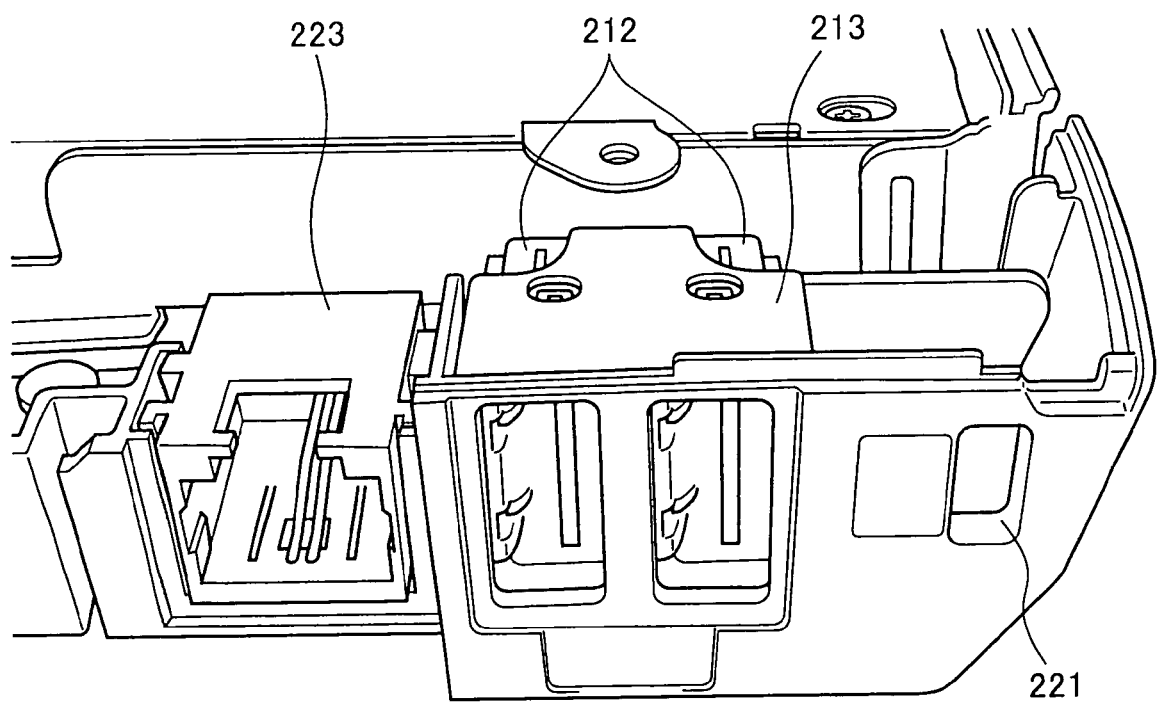
FIG. 10 is a perspective view showing a corner of the rear end surface of the main unit, which corner is in the hinge section side.

FIG. 10 is a perspective view showing a corner of the rear end surface of the main unit 20, which corner is in the hinge section side. The main unit 20 shown in FIG. 1 has a housing composed of a top cover and a bottom cover. FIG. 10 shows the bottom cover and the inside thereof with the top cover being removed.

As shown in FIG. 10, a security lock hole 221 is formed in the bottom cover at a position closest to the corner. In addition, two USB connectors 212 are disposed side by side next to the security lock hole 221, and a modem connector 223 is disposed next to the security lock hole 221. All these connectors are amounted on the motherboard.

When an external connector 501 (see FIG. 12) capable of being mated with either one of the two USB connectors 212 is inserted into or removed therefrom, a force in a lateral direction is applied to the mated one of the two USB connectors 212. In order to sufficiently withstand the force, the two USB connectors 212 are supported by a support fitting 213.

The security lock hole 221 is a hole used for securing a locking device that restricts movements of the notebook PC 10. The locking device is provided with a key section. Once the key section is inserted into the security lock hole 221, the key section cannot be removed therefrom as it becomes large inside the security lock hole 221. In this way, the movement of the notebook PC 10 can be restricted.

Figure 11:
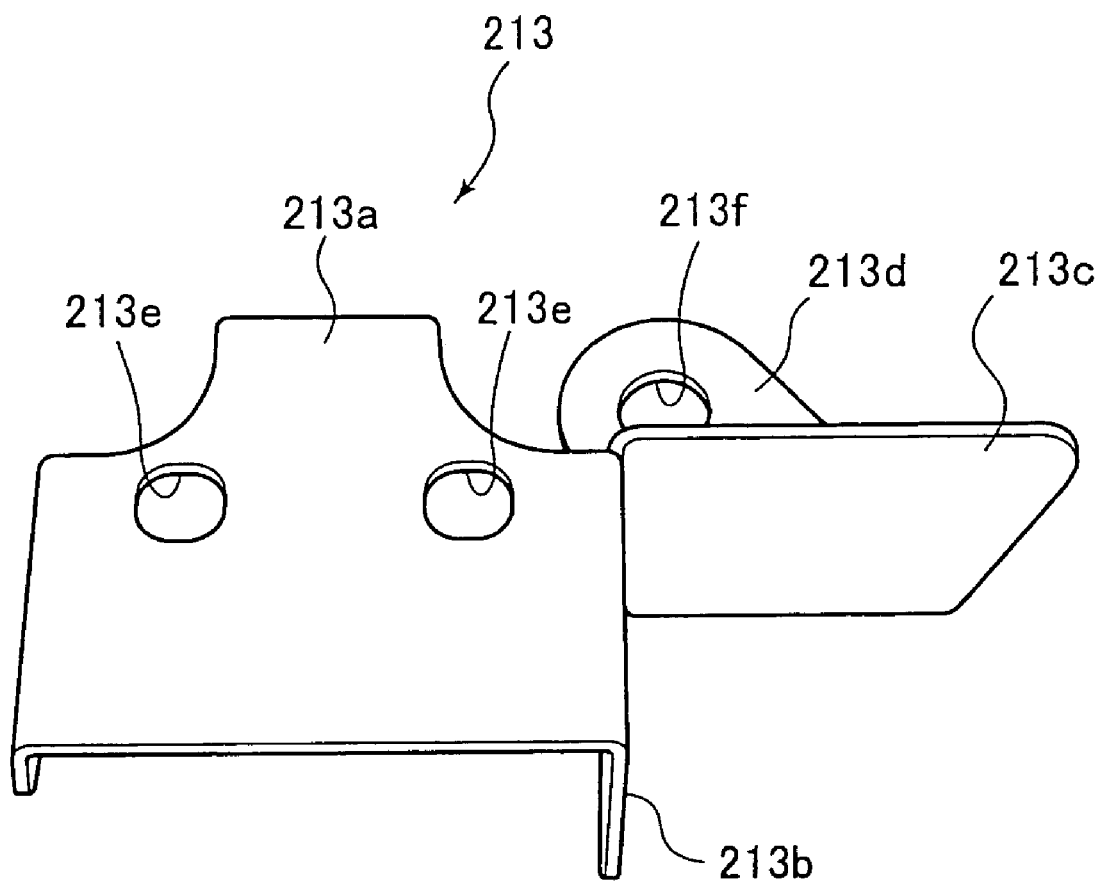
FIG. 11 is a perspective view of a support fitting.

FIG. 11 is a perspective view of the support fitting 213.

The support fitting 213 has a pressure plate 213a for pressing and holding the two USB connectors 212, two divider walls 213b and 213c and a screw-fastened plate 213d. The pressure plate 213a has two-holes 213e, and the screw-fastened plate 213d has a screw hole 213f.

Figure 12:
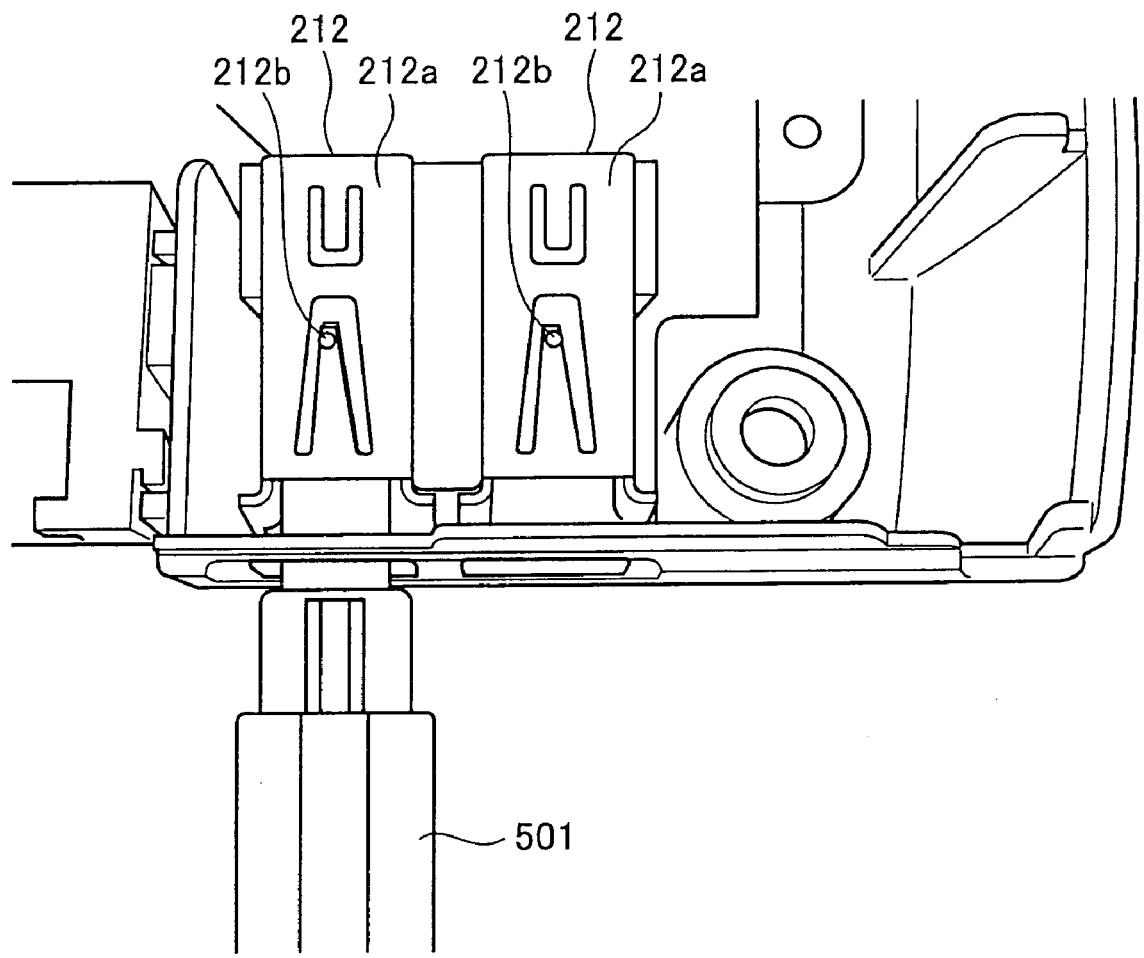
FIG. 12 is a plan view of the same portion shown in FIG. 10 with the support fitting being removed.

FIG. 12 is a plan view of the same portion shown in FIG. 10 with the support fitting 213 being removed.

The pressure plate 213a of the support fitting 213 shown in FIG. 11 serves to press and hold top surfaces 212a of the respective two USB connectors 212 so that these USB connectors 212 can withstand a force that may be accidentally applied thereto. Meanwhile, the top surfaces of the USB connectors 212 each have a projection 212b that remains in a position lower than the top surface of the external connector 501 when the external connector 501 is removed therefrom, and projects above the top surface of the external connector 501 when the external connector 501 is inserted therein.

As shown in FIG. 12, the two USB connectors 212 are disposed next to each other such that the top surfaces 212a thereof become flush with each other. The pressure plate 213a of the support fitting 213 shown in FIG. 11 serves to press and hold the top surfaces 212a being flush with each other. The two holes 213e of the pressure plate 213a each serve as an escape section by receiving the projection 212b of any of the USB connectors 212 when it projects.

Depending on size of the external connector 501, the projection 212b may project greatly or slightly above the top surface 212a when the external connector 501 is inserted. However, since the two holes 213e of the pressure plate 213a are formed to serve as an escape section, the external connector 501 in any size can be readily inserted or removed and the two USB connectors 212 can be sufficiently secured in a simple structure.

Figure 13:
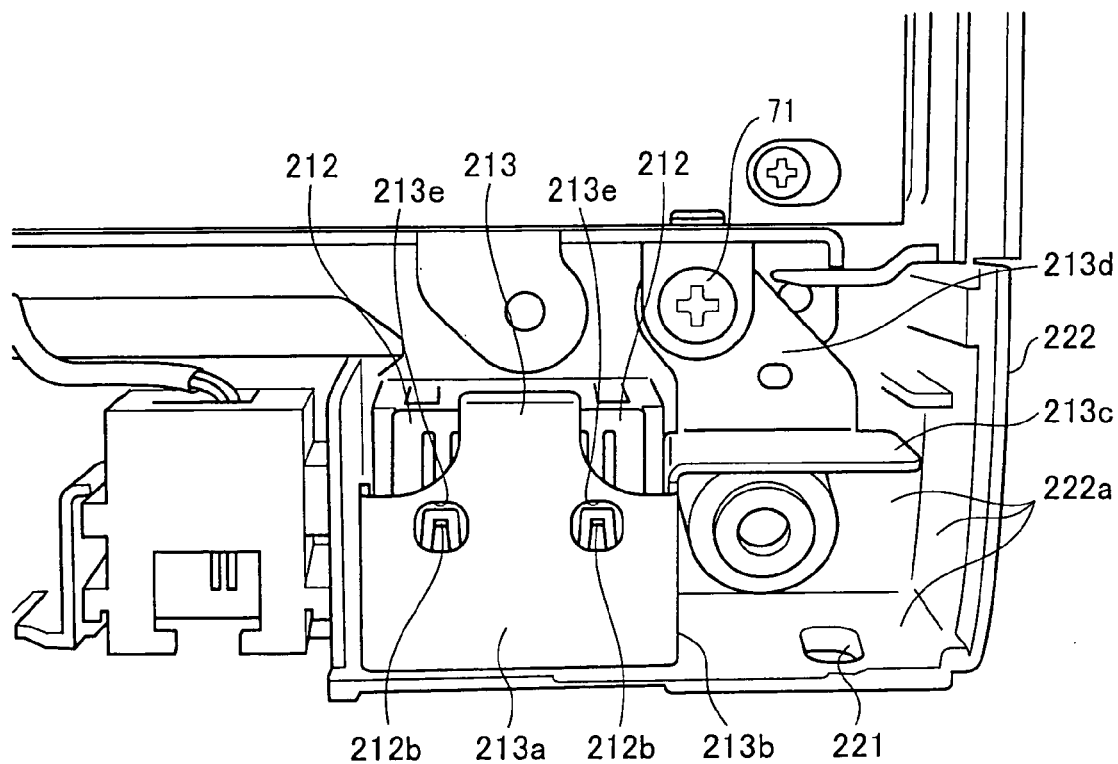
FIG. 13 is a perspective view of the same portion shown in FIG. 10 with the support fitting being attached thereto, as viewed obliquely from above.

FIG. 13 is a perspective view of the same portion shown in FIG. 10 with the support fitting 213 being attached thereto, as viewed obliquely from above so that the back of the security lock hole 221 becomes visible.

The support fitting 213 is fixed on the bottom cover 222 by a screw 71.

In the state when the support fitting 213 is thus fixed, the divider walls 213b and 213c of the support fitting 213 serve as two walls defining a space around the security lock hole 221 in the inside of the housing formed by the bottom cover 222 and the top cover (not shown). The divider walls 213b and 213c define the space in cooperation with inner walls 222a of the bottom cover 222 and inner walls of the top cover.

The security lock hole 221 is formed for locking. However, many users provide their notebook PCs with no locking device. In this case, if the space around the security lock hole 221 is not demarcated, dust will enter and settle in the inside of the housing thereby preventing air cooling or causing a short in a circuit resulting in malfunction. Therefore, the embodiment is configured to demarcate the space around the security lock hole 221 with the support fitting 213 for supporting the USB connectors 212, which makes it possible to prevent dust from entering the inside of the housing without increasing the number of components.

Figure 14:
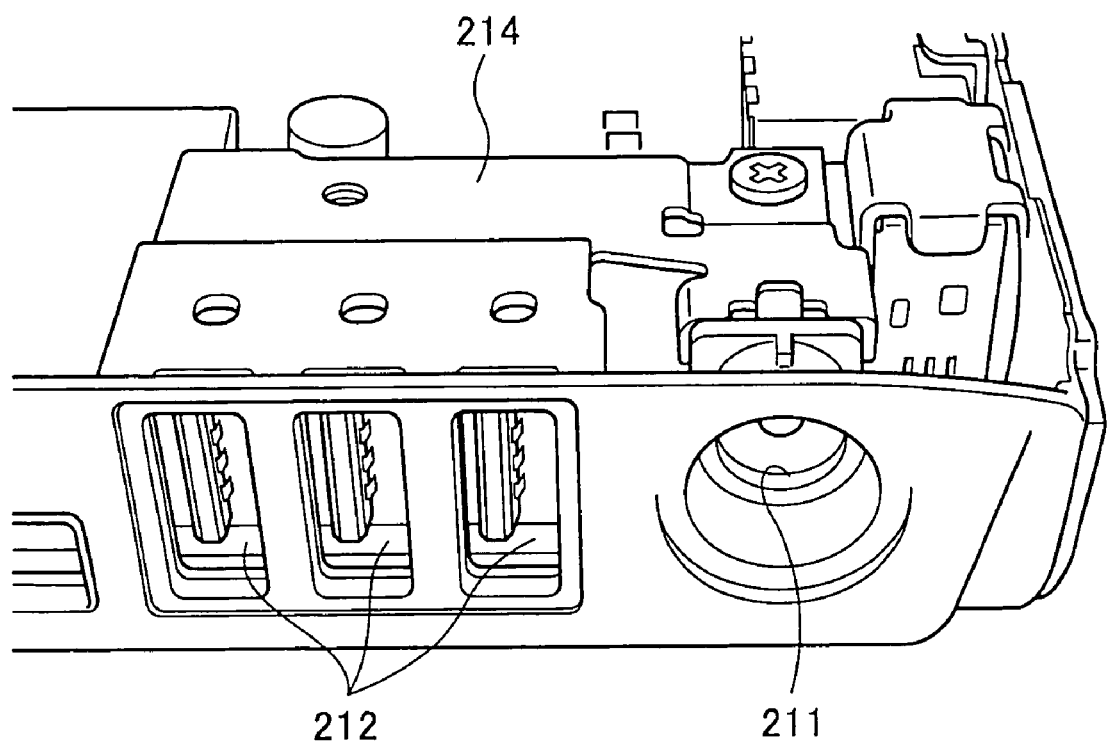
FIG. 14 is a perspective view showing one corner of the right flank of the main unit, which corner is in the hinge section side and is also shown in FIG. 1.

FIG. 14 is a perspective view showing one corner of the right flank of the main unit 20, which corner is in the hinge section side and is also shown in FIG. 1. FIG. 14 shows the bottom cover and the inside thereof with the top cover being removed.

FIG. 14 also shows the DC power connection terminal 211 and the three USB connectors 212 shown in FIG. 1. These USB connectors 212 are disposed such that the top surfaces thereof become flush with one another.

The DC power connection terminal 211 and the three USB connectors 212 are supported by a support fitting 214.

Figure 15:
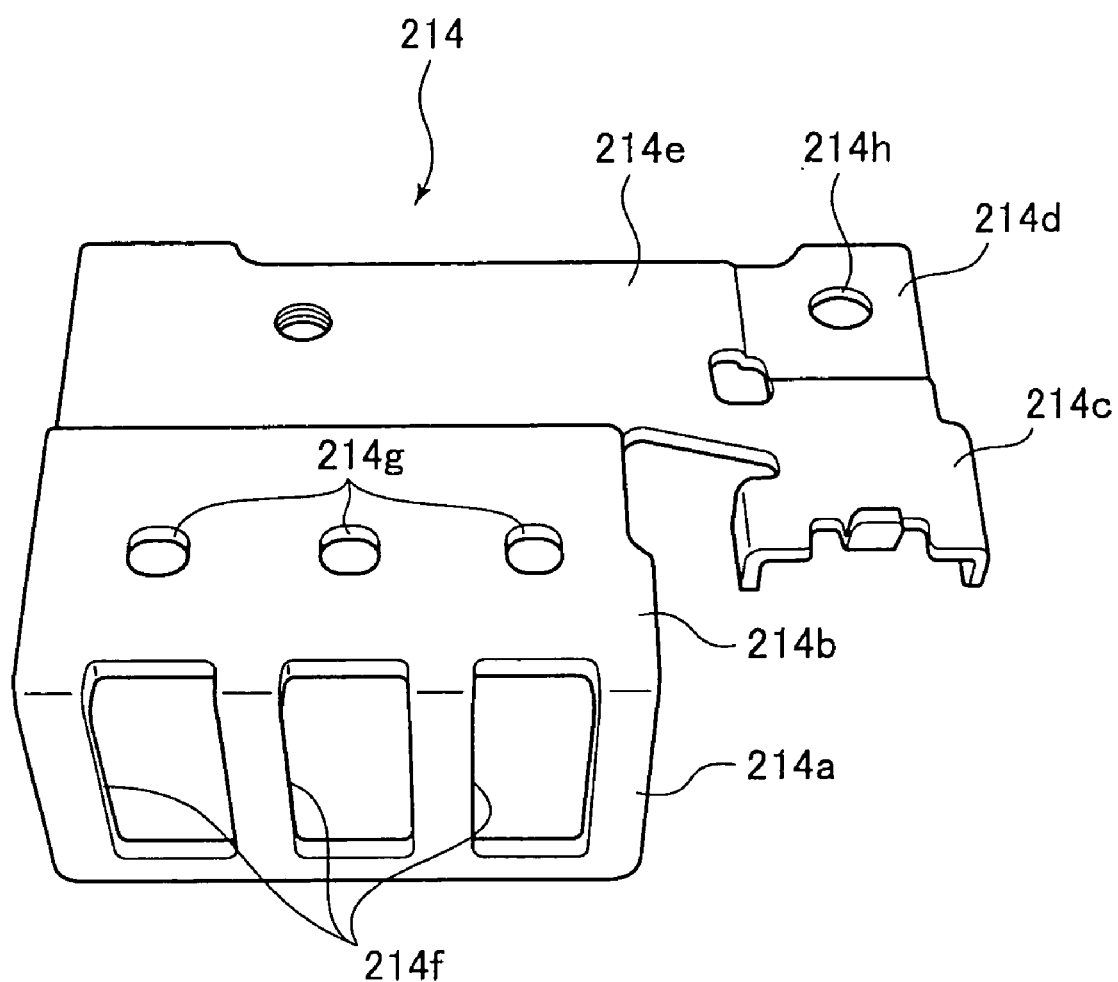
FIG. 15 is a perspective view of a support fitting.

FIG. 15 is a perspective view of the support fitting 214.

The support fitting 214 has a front wall 214a, a pressure plate 214b, a terminal-retaining plate 214c, a screw-fastened section 214d and a link section 214e. The front wall 214a has openings 214f for the USB connectors 212. The pressure plate 214b has three holes 214g serving as escape sections by receiving three projections 212b (see FIG. 16) of the respective USB connectors 212 and serves to press and hold the top surfaces of the USB connectors 212. The terminal-retaining plate 214c serves to press and hold the DC power connection terminal 211. The screw-fastened section 214d has a hole 214h used for screw fastening. The link section 214e serves to link the pressure plate 214b, the terminal-retaining plate 214c and the screw-fastened section 214d.

Figure 16:
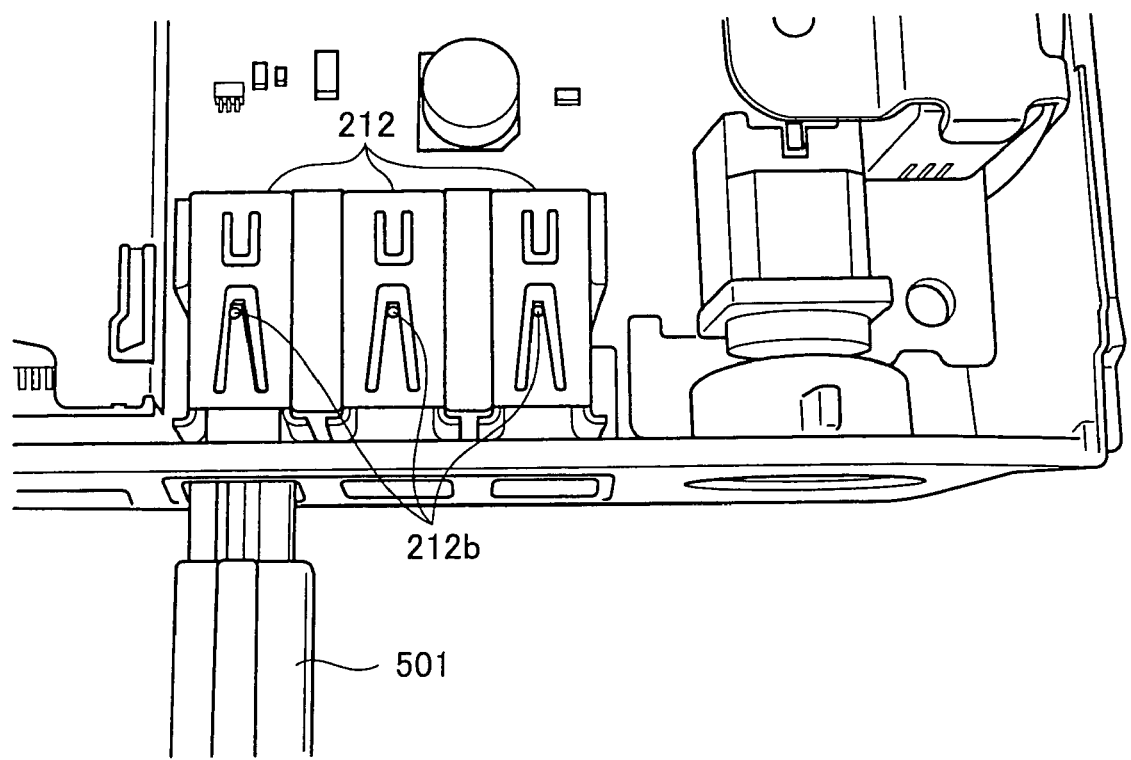
FIG. 16 is a plan view of the same portion shown in FIG. 14 with the support fitting shown in FIG. 15 being removed.
Figure 17:
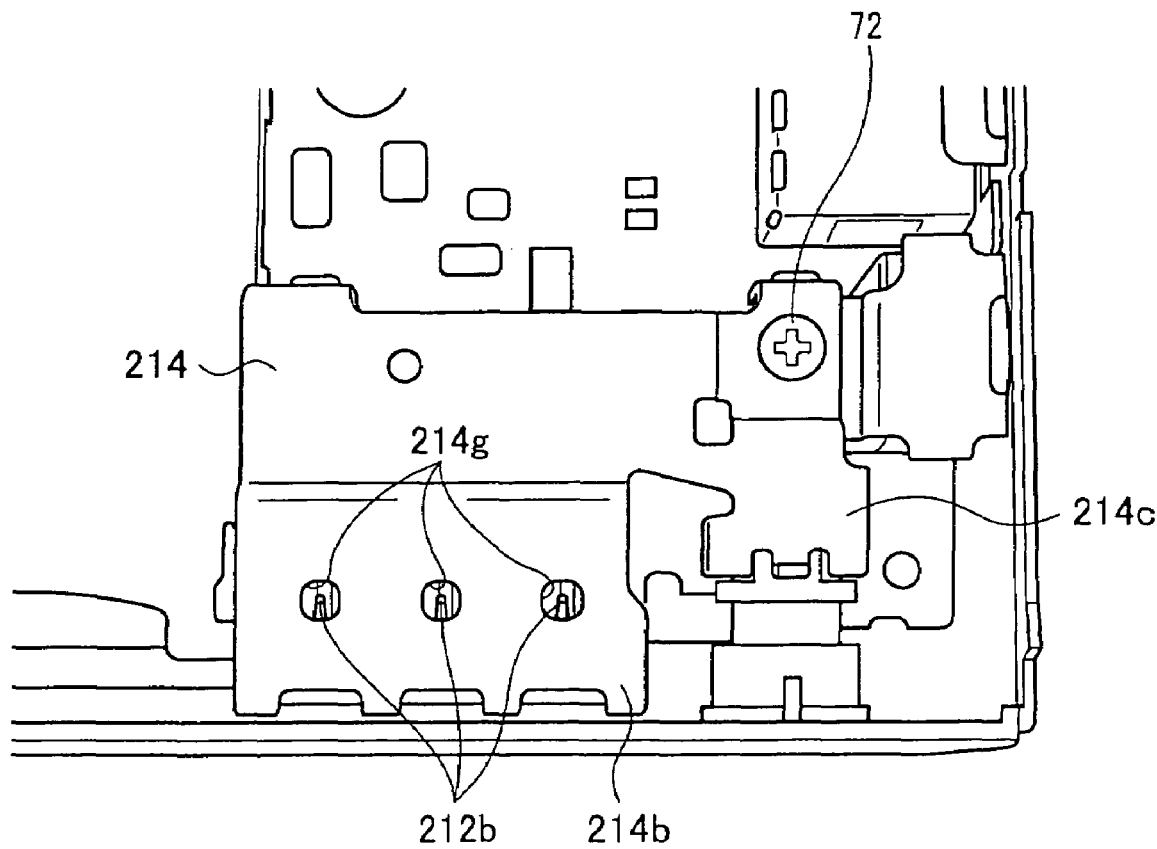
FIG. 17 is a plan view of the same portion shown in FIGS. 14 and 16 with the support fitting being attached thereto.

FIG. 16 is a plan view of the same portion shown in FIG. 14 with the support fitting 214 being removed. FIG. 17 is a plan view of the same portion shown in FIGS. 14 and 16 with the support fitting 214 being attached thereto.

The support fitting 214 is fixed to the bottom cover with a screw 72.

As described above, the three USB connectors 212 have the respective projections 212b. Each of the projections 212b remain in a position lower than the top surface of an external connector 501 when the external connector 501 is removed therefrom, and projects above the top surface of the external connector 501 when the external connector 501 is inserted therein.

The pressure plate 214b of the support fitting 214 shown in FIG. 15 has three holes 214g each serving as an escape section by accepting the corresponding one of the projections 212b of the three USB connectors 212. Because such an escape section (hole 214g) is provided, the external connector 501 in any size can be readily inserted or removed and the three USB connectors 212 can be securely fixed. In addition, the support fitting 214 alone can simultaneously support both the DC power connection terminal 211 and the three USB connectors 212 as shown in FIG. 17.

4. Hard Disk Structure

Figure 18:
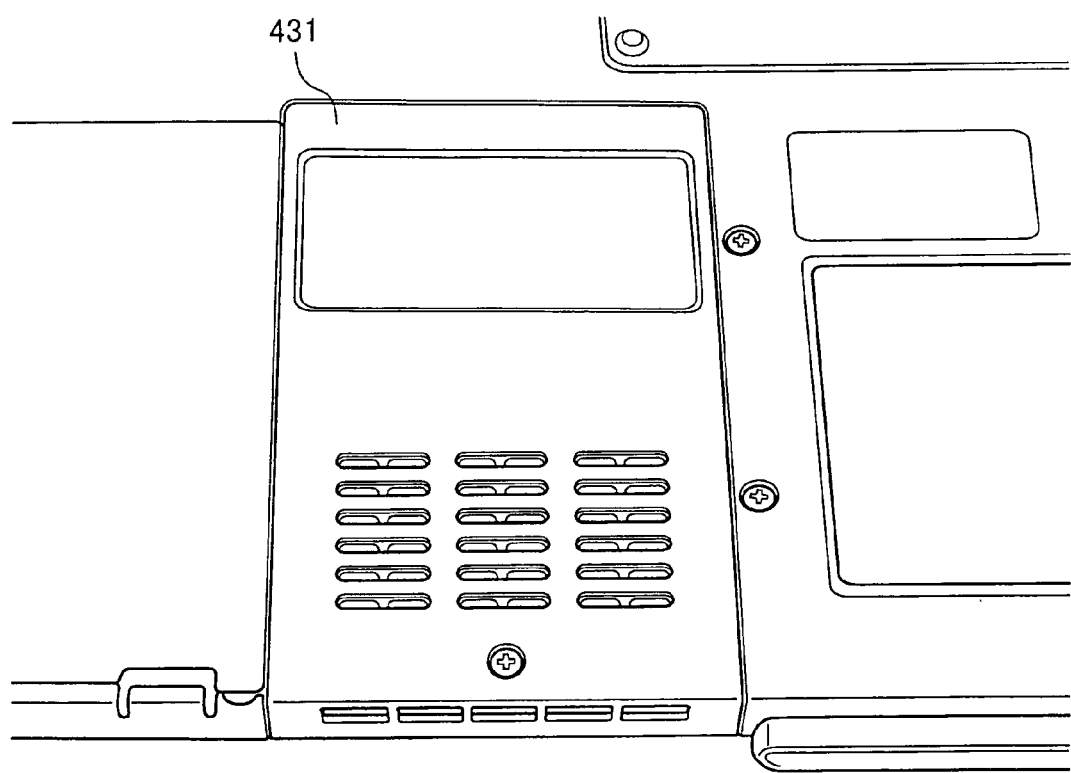
FIG. 18 is a diagram showing a part of the bottom surface of the main unit.
Figure 19:
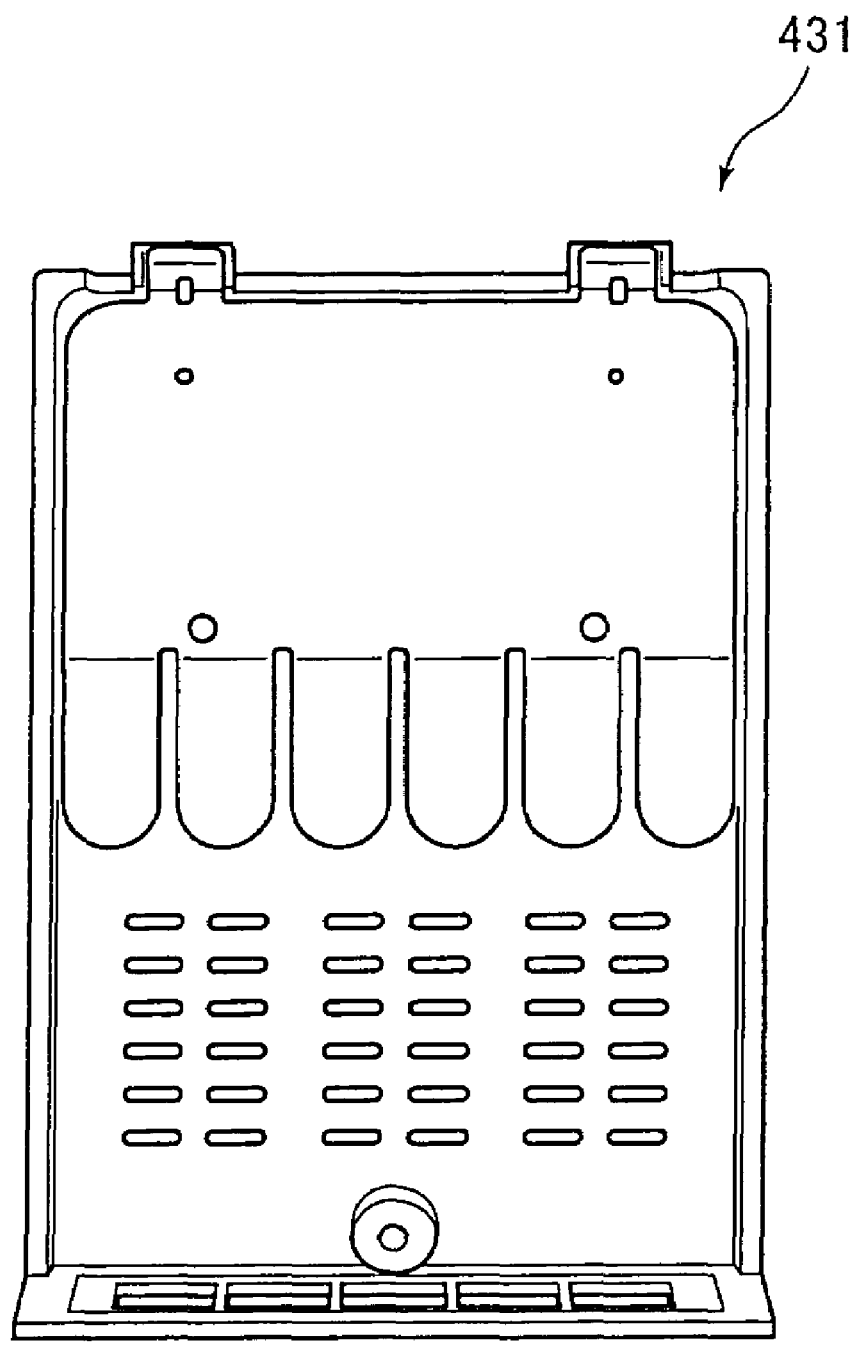
FIG. 19 is a diagram showing an inner surface of a lid provided on the bottom surface.

FIG. 18 is a diagram showing a part of the bottom surface of the main unit 20, and FIG. 19 is a diagram showing an inner surface of a lid 431 provided on the bottom surface.

FIGS. 18 and 19 both show the lid 431 for covering a portion where a hard disk assembly is disposed. The lid 431 forms a part of the bottom cover of the main unit 20 and is removably attached thereto.

Figure 20:
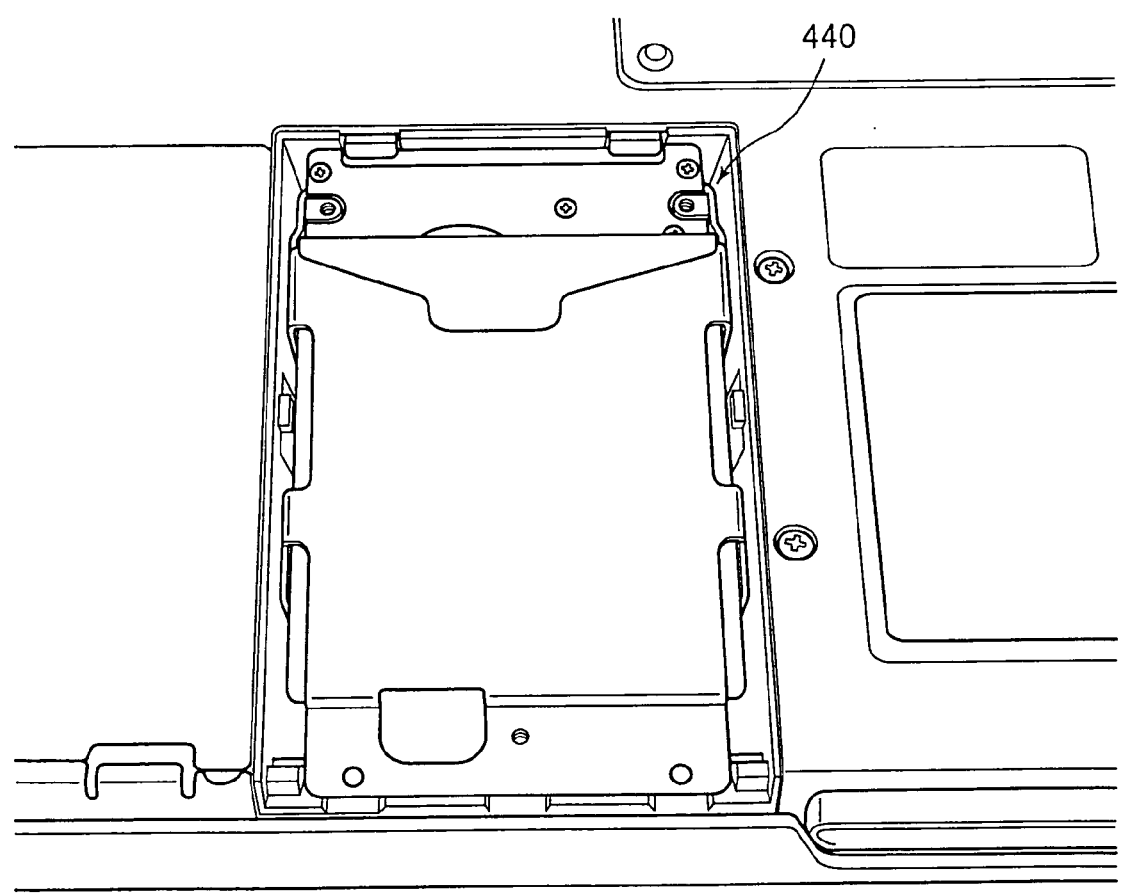
FIG. 20 is a diagram showing the same portion shown in FIG. 18 with the lid being removed.

FIG. 20 is a diagram showing the same portion shown in FIG. 18 with the lid 431 being removed.

In this portion, a hard disk assembly 440 is disposed. The hard disk assembly 440 is a unit including a hard disk drive 441. The hard disk drive 441 contains a hard disk serving as a large-capacity storage medium, and reads and writes information from and onto the hard disk while rotating the disk.

Figure 21:
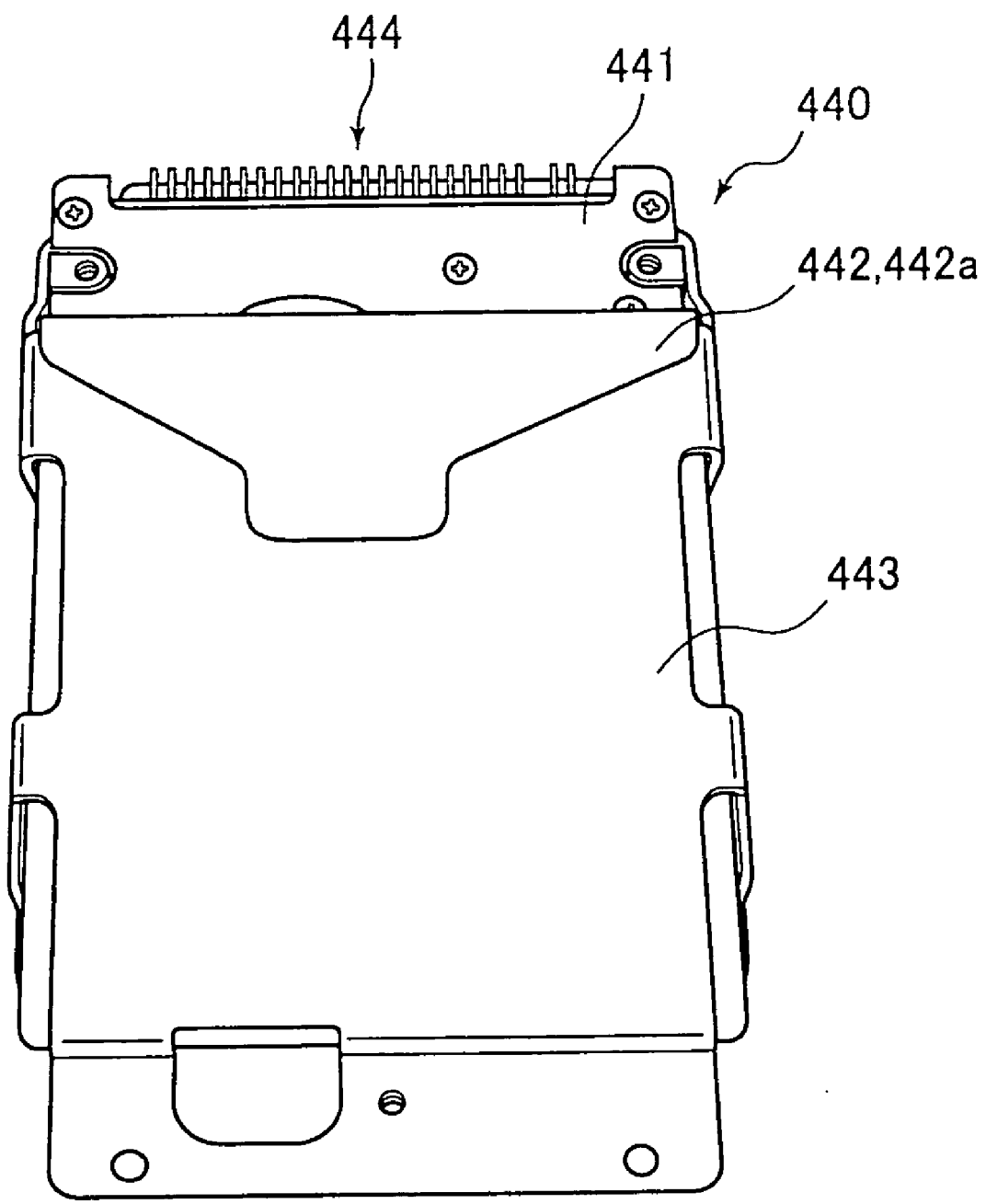
FIG. 21 is a diagram showing a hard disk assembly.

FIG. 21 is a diagram showing the hard disk assembly 440 alone.

FIG. 21 shows the hard disk drive 441 and an insulating sheet 442 that covers the top of a circuit board of the hard disk drive 441. Only a flange section 442a of the insulating sheet 442 is shown in FIG. 21, which will be described later. FIG. 21 also shows a support fitting 443 for increasing the strength of the hard disk drive 441 and used for attaching the hard disk drive 441 to the main unit 20. Further, FIG. 21 shows a connector 444 fixed at one end of the circuit board of the hard disk drive 441 and used for electrical connection with a connector mounted on the motherboard in the main unit 20.

Figure 22:
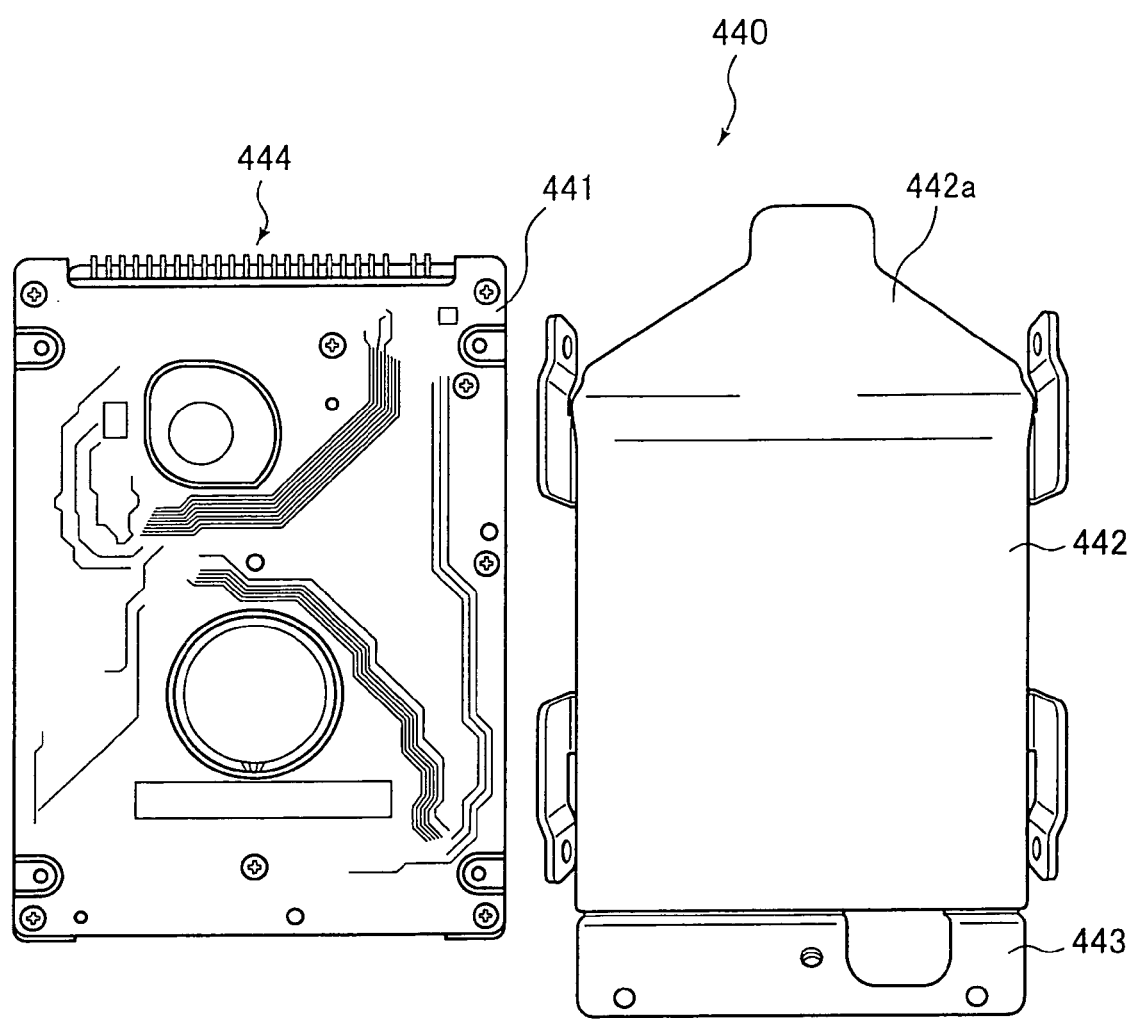
FIG. 22 is a diagram showing the hard disk assembly, in which a hard disk drive and a support fitting are separately shown.

FIG. 22 is a diagram showing the hard disk assembly 440, in which the hard disk drive 441 and the support fitting 443 with the insulating sheet 442 attached thereto are separately shown. FIG. 22 shows a surface of the support fitting 443 (a surface of the insulating sheet 442) to be in contact with the circuit board of the hard disk drive 441.

The support fitting 443 is a conductive metal plate component. Therefore, if the support fitting 443 is directly disposed on the circuit board, the support fitting 443 will cause a short in a circuit on the circuit board resulting in a malfunction. For this reason, the support fitting 443 is laid on the hard disk drive 441 with the insulating sheet 442 interposed therebetween.

The insulating sheet 442 serves to keep insulation between the hard disk drive 441 and the support fitting 443 and has the flange section 442a. As shown in FIG. 21, the flange section 442a is a portion spread on the back surface of the support fitting 443 from an edge in the connector 444 side.

As shown in FIG. 21, the flange section 442a has such a shape that a central portion thereof is broader than portions closer to both ends of the edge where the flange section 442a is exposed.

Figure 23:
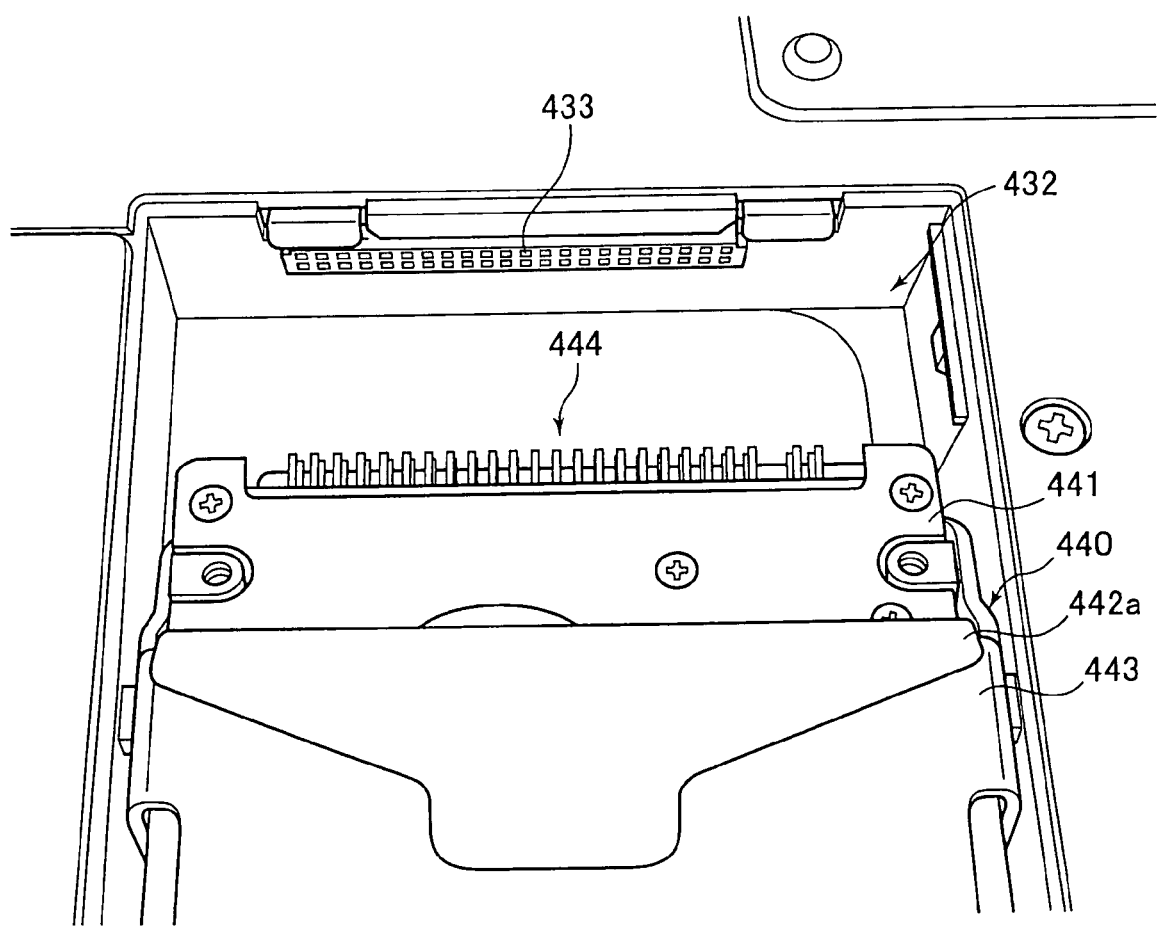
FIG. 23 is a diagram showing the inside of a portion for accommodating the hard disk assembly with the lid being removed and the hard disk assembly being shifted to be removed.

FIG. 23 is a diagram showing the inside of a portion for accommodating the hard disk assembly 440 with the lid 431 being removed and the hard disk assembly 440 being shifted to be removed.

FIG. 23 illustrates the inside of a part of the main unit 20, where an opening 432 to be covered by the lid 431 is formed. The hard disk assembly 440 is disposed inside the opening 432 and a connector 433 is disposed adjacent to the opening 432 to be mated with the connector 444 of the hard disk drive 441. By pulling the flange section 442a of the insulating sheet 442 in the state when the connectors 433 and 444 are mated with each other, the connector 444 of the hard disk drive 441 can be disconnected from the connector 433 of the main unit 20 and thereby the hard disk drive 441 can be removed.

As described above, the central portion of the flange section 442a is broader and is usually held by a user while being pulled. Therefore, a force is uniformly applied to the connector 444 in the lateral direction and it is possible to prevent excessive force from being applied in a slating direction.

The opening 432 has space barely enough for the hard disk assembly 440. However, the flange section 442a is formed by extending a part of the insulation sheet 442 so that the hard disk assembly 440 can be removed by pulling the flange section 442a, thereby improving operability when such removal is necessary. The flange section 442a is an extension of the insulation sheet 442. The insulation sheet 442 is an essential element and therefore, there is no need to provide an additional component to be used as a pull. Besides, because the insulation sheet 442 is a thin material, there is no need to provide extra space for a pull.

5. Wiring Structure Outside Hinge Section

Figure 24:
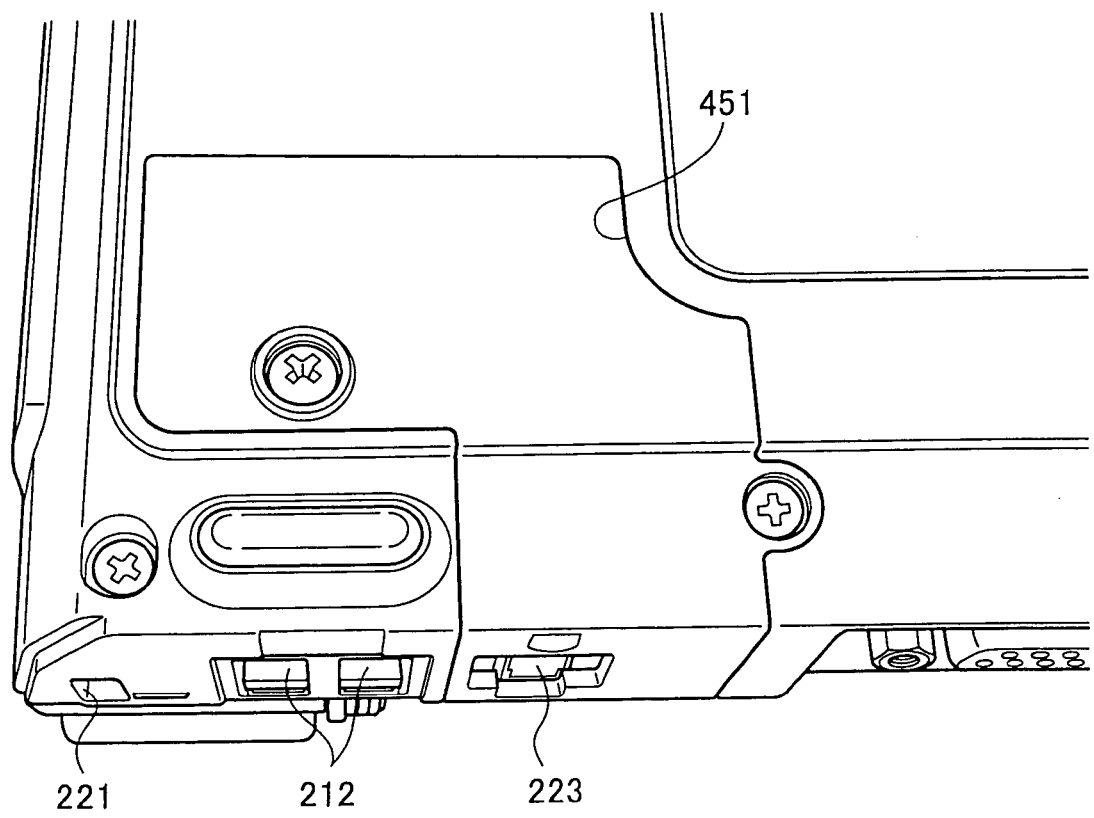
FIG. 24 is a perspective view showing a corner of the rear end surface of the main unit, which corner is in the hinge section side, as viewed from the bottom of the main unit.

FIG. 24 is a perspective view showing a corner of the rear end surface of the main unit 20, which corner is in the hinge section side, as viewed from the bottom of the main unit 20.

FIG. 24 illustrates the security lock hole 221 and the two USB connectors 212 which are also shown in FIG. 13. Because FIG. 24 is a view seen from the bottom of the main unit 20, the security lock hole 221 and the two USB connectors 212 are aligned in a direction opposite to that in FIG. 13. Next to these USB connectors 212, the modem connector 223 is disposed. FIG. 24 also shows a removably attachable lid 451.

Figure 25:
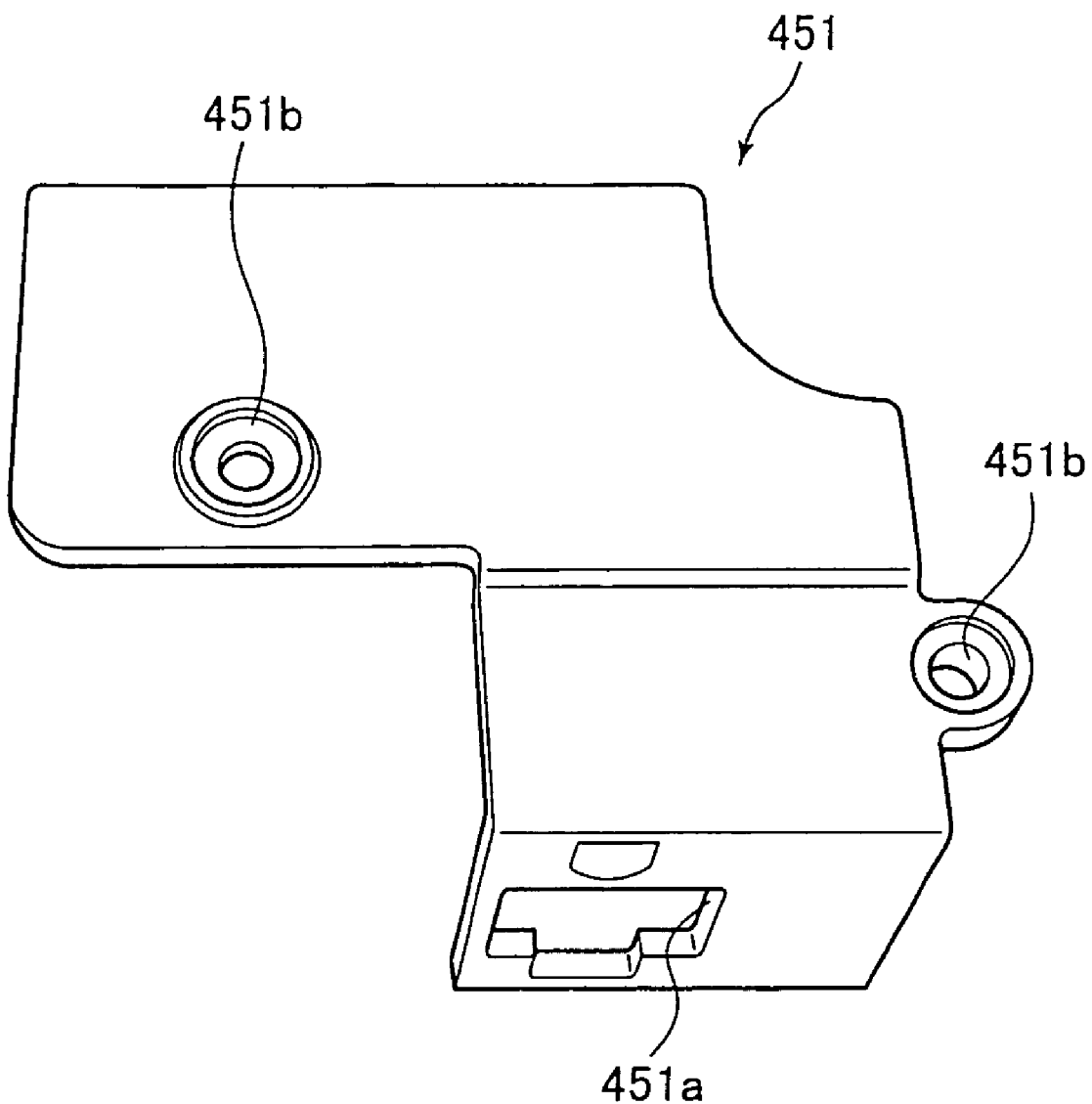
FIG. 25 is a diagram showing a lid shown in FIG. 24 alone.

FIG. 25 is a diagram showing the lid 451 alone.

The lid 451 has an opening 451a for the modem connector 223 shown in FIG. 24 and two screw holes 451b.

Figure 26:
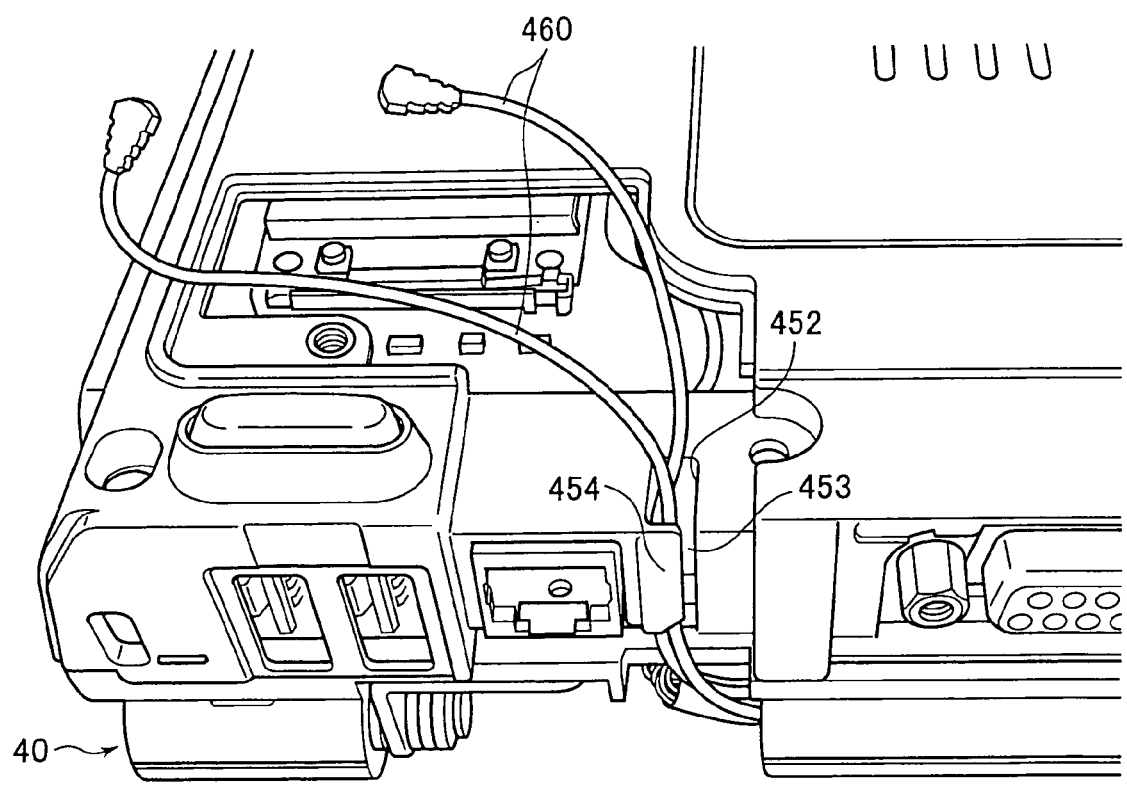
FIG. 26 is a schematic diagram showing an inside structure with the lid shown in FIG. 24 being removed.

FIG. 26 is a schematic diagram showing an inside structure with the lid 451 being removed.

A portion to be covered by the lid 451 is so formed as to sink at a depth equal to the thickness of the lid 451, so that the lid 451 becomes flush with the bottom surface of the main unit 20 when the lid 451 is put thereon.

FIG. 26 illustrates two cables 460 extending from the display unit 30 to the main unit 20 while running through the outside of the hinge section 40 shown in FIG. 1. The cables 460 each have an end in the main unit 20 side, which is not wired yet.

The main unit 20 has a vertically extending (in the thickness direction of the main unit 20) guide channel 452 for vertically guiding the cables 460. The main unit 20 also has a wing 454 for covering a side of the channel 452 while leaving a slit 453. The slit 453 has a width equal to the diameter of the cable 460 so that the cables 460 can be inserted into the channel 452 through the slit 453 from the side.

Thus, the cables 460 extending in the lateral direction from the display unit 30 are vertically guided by the channel 452 while making a curve. The slit 453 is formed in the inner side of the curve made by the cables 460 whereas the wing 454 is formed to cover the outer side of the curve. The cables 460 laterally extending from the display unit 30 tend to linearly extend due to rigidity thereof and therefore, the cables 460 stay in the side away from the slit 453 within the channel 452. Accordingly, it is possible to prevent the cables 460 from coming off through the slit 453.

As described above, the embodiment employs such a structure that the cables 460 running outside the hinge section are received and vertically guided by the channel 452. Thanks to such a structure, it is possible to prevent the cables 460 from running off the correct route in a stage when the end of the cable 460 is connected to a circuit in the main unit 20, specifically, in a stage when the end is connected to a circuit mounted on the bottom surface of the motherboard built in the main unit 20, or in a stage when the lid 451 shown in FIG. 25 is finally put on. Accordingly, assembly performance has been improved.

Figure 27:
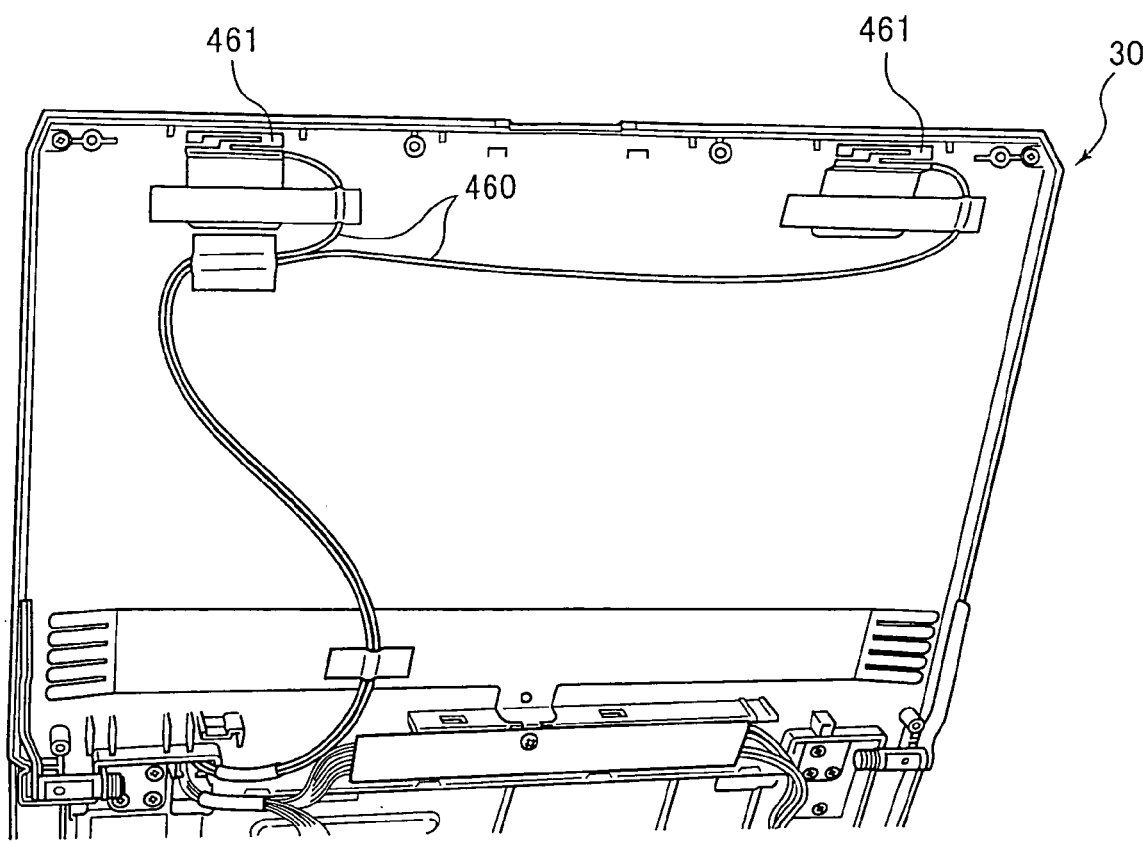
FIG. 27 is a diagram showing an inner surface of the display unit to which the rear surface of a display screen faces, with the display screen being removed.

FIG. 27 is a diagram showing an inner surface of the display unit 30 to which the rear surface of the display screen 301 faces, with the display screen 301 being removed. Disposed on an upper part of the display unit 30 are two antennas 461 used for wireless communication. The two antennas 461 are each connected to corresponding one of the two cables 460.

The cables 460 are disposed to downwardly extend until they come to a position closer to the hinge section 40 and then run outside the hinge section 40 as shown in FIG. 26 after passing through an opening formed in the housing of the main unit 20. Subsequently, the cables 460 are guided by the channel 452 and connected to a circuit, which is disposed on the bottom surface of the motherboard built in the main unit 20 and used for wireless communication by way of the antennas 461.

What is claimed is:

1. An electronic apparatus comprising:
   a housing having an opening;
   a connector disposed at a position allowing the connector to face out from the opening and with which a mating connector is removably mated; and
   a fixing component that secures the connector to the electronic apparatus,
   wherein the connector has a projection that projects beyond outline dimensions of the connector in one of a state when the connector is mated with the mating connector and a state when the connector is demated from the mating connector, and
   the fixing component has a pressure plate that is spread on and in contact with a surface of the connector where the projection is formed, the pressure plate having an escape section for accepting the projection, and the fixing component further has a plate extending substantially perpendicular to a side wall of the connector, the plate extending substantially perpendicular to the side wall of the connector having a hole for fixing the fixing component to the electronic apparatus.

2. The electronic apparatus according to claim 1, wherein the escape section is a hole formed in the pressure plate.

3. The electronic apparatus according to claim 1, wherein the connector is plurally disposed such that adjacent surfaces of the connectors become flush with each other, the surfaces each having a projection formed thereon, and
   the fixing component has a pressure plate that is spread on and in contact with the surfaces of the connectors where the projections are formed, and the pressure plate has escape sections for accepting the projections, so that the connectors are secured to the electronic apparatus with the fixing component that is a single component.

4. The electronic apparatus according to claim 1, wherein the connector is a USB connector.

5. A fixing component capable of securing a connector to an electronic apparatus, the electronic apparatus including a housing having an opening and a connector disposed at a position allowing the connector to face out from the opening and with which a mating connector is removably meted, wherein:
   the connector comprises a projection that projects beyond outline dimensions of the connector in one of a state when the connector is mated with the mating connector and a state when the connector is demated from the mating connector, and
   the fixing component comprises a pressure plate that is spread on and in contact with a surface of the connector where the projection is formed, the pressure plate having an escape section for accepting the projection, and the fixing component further comprises a plate extending substantially perpendicular to a side wall of the connector, the plate extending substantially perpendicular to the side wall of the connector having a hole for fixing the fixing component to the electronic apparatus.

6. The fixing component according to claim 5, wherein the escape section is a hole formed in the pressure plate.

7. The fixing component according to claim 5, wherein the connector is a USB connector.

8. A fixing component to secure a connector to an electronic apparatus, the connector having an opening through which to receive a mating connector, the fixing component comprising:
   a pressure plate contacting a surface of the connector;
   at least one opening to receive a projection from the connector in response to the connector receiving the mating connector; and
   a plate extending in a substantially perpendicular direction from a side of the fixing component to demarcate an area within the electronic apparatus, the plate extending in the substantially perpendicular direction having a bole for fixing the fixing component to the electronic apparatus.

* * * * *

UNITED STATES PATENT AND TRADEMARK OFFICE
CERTIFICATE OF CORRECTION

PATENT NO. : 7,462,058 B2 Page 1 of 1
APPLICATION NO. : 11/639302
DATED : December 9, 2008
INVENTOR(S) : Tanaka et al.

It is certified that error appears in the above-identified patent and that said Letters Patent is hereby corrected as shown below:

Claim 5, Column 12, line 23, change "meted," to --mated,--;

Claim 8, Column 12, line 54, change "bole" to --hole--.

Signed and Sealed this

Twenty-fourth Day of February, 2009

JOHN DOLL
*Acting Director of the United States Patent and Trademark Office*